United States Patent
Haugen et al.

(10) Patent No.: US 10,700,372 B2
(45) Date of Patent: Jun. 30, 2020

(54) MEMBRANE ELECTRODE ASSEMBLY

(71) Applicant: 3M INNOVATIVE PROPERTIES COMPANY, St. Paul, MN (US)

(72) Inventors: Gregory M. Haugen, Edina, MN (US); Ljiljana L. Atanasoska, Oakland, CA (US); Radoslav Atanasoski, Oakland, CA (US); Andrew T. Haug, Woodbury, MN (US); Dennis F. Van Der Vliet, Lubbock, TX (US); Jimmy L. Wong, Oakdale, MN (US); Andrew M. Armstrong, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 146 days.

(21) Appl. No.: 15/531,786

(22) PCT Filed: Dec. 9, 2015

(86) PCT No.: PCT/US2015/064698
§ 371 (c)(1),
(2) Date: May 31, 2017

(87) PCT Pub. No.: WO2016/100034
PCT Pub. Date: Jun. 23, 2016

(65) Prior Publication Data
US 2017/0294669 A1      Oct. 12, 2017

Related U.S. Application Data

(60) Provisional application No. 62/096,097, filed on Dec. 23, 2014, provisional application No. 62/091,851, filed on Dec. 15, 2014.

(51) Int. Cl.
H01M 4/86        (2006.01)
H01M 4/90        (2006.01)
(Continued)

(52) U.S. Cl.
CPC ....... *H01M 8/1004* (2013.01); *H01M 4/8615* (2013.01); *H01M 4/90* (2013.01); *H01M 4/92* (2013.01)

(58) Field of Classification Search
CPC .... H01M 8/1004; H01M 4/92; H01M 4/8615; H01M 4/90
See application file for complete search history.

(56) References Cited

U.S. PATENT DOCUMENTS

| 4,340,276 A | 7/1982 | Maffitt |
| 4,568,598 A | 2/1986 | Bilkadi |

(Continued)

FOREIGN PATENT DOCUMENTS

| JP | 2005-216834 | 8/2005 |
| JP | 2006-134629 A | 5/2006 |

(Continued)

OTHER PUBLICATIONS

Chen et al Electrochim. Acta 54 (2009) 5454-5462 (Year: 2009).*

(Continued)

*Primary Examiner* — Lisa S Park

(57) ABSTRACT

Membrane electrode assembly comprising oxygen evolution reaction catalyst disposed in gas distribution layer (100, 700) or between gas distribution layer (100, 700 and gas dispersion layer (200, 600). Membrane electrode assemblies described herein are useful, for example, in electrochemical devices such as a fuel cell.

13 Claims, 3 Drawing Sheets

(51) Int. Cl.
H01M 8/1004 (2016.01)
H01M 4/92 (2006.01)

(56) References Cited

U.S. PATENT DOCUMENTS

| | | | |
|---|---|---|---|
| 4,812,352 | A | 3/1989 | Debe |
| 5,039,561 | A | 8/1991 | Debe |
| 5,306,579 | A | 4/1994 | Shepard, Jr. |
| 5,338,430 | A | 8/1994 | Parsonage |
| 5,879,827 | A | 3/1999 | Debe |
| 5,879,828 | A | 3/1999 | Debe |
| 6,040,077 | A | 3/2000 | Debe |
| 6,136,412 | A | 10/2000 | Spiewak |
| 6,319,293 | B1 | 11/2001 | Debe |
| 6,465,041 | B1 | 10/2002 | Frisk |
| 6,610,436 | B1 | 8/2003 | Dearnaley |
| 6,624,328 | B1 | 9/2003 | Guerra |
| 7,147,959 | B2 | 12/2006 | Kohler |
| 7,348,088 | B2 | 3/2008 | Hamrock |
| 7,419,741 | B2 | 9/2008 | Vernstrom |
| 7,901,829 | B2 | 3/2011 | Debe |
| 2002/0004453 | A1 | 1/2002 | Haugen |
| 2004/0048466 | A1 | 3/2004 | Gore |
| 2006/0075630 | A1 | 4/2006 | Valentine |
| 2008/0145733 | A1* | 6/2008 | Asazawa ............... H01M 4/90 429/482 |
| 2010/0000679 | A1 | 1/2010 | Han |
| 2010/0178582 | A1 | 7/2010 | Zhang |
| 2010/0279210 | A1 | 11/2010 | Debe |
| 2013/0022890 | A1* | 1/2013 | Kundu ............... H01M 4/8828 429/480 |
| 2014/0349215 | A1* | 11/2014 | Debe ................... H01M 8/1004 429/524 |
| 2015/0155567 | A1 | 6/2015 | Zhang |

FOREIGN PATENT DOCUMENTS

| | | |
|---|---|---|
| JP | 2008-016356 A | 1/2008 |
| JP | 2010-049933 | 3/2010 |
| WO | WO 2009/091947 | 7/2009 |
| WO | WO 2011/052865 | 5/2011 |
| WO | WO 2014/100811 | 6/2014 |
| WO | WO 2014/189637 | 11/2014 |

OTHER PUBLICATIONS

Altmann, "Bifunctional electrodes for unitised regenerative fuel cells", Electrochimica Acta, Apr. 15, 2011, vol. 56, No. 11, pp. 4287-4293.

Atanasoski, "Durable Catalysts for Fuel Cell Protection During Transient Conditions", 2010 Department of Energy Vehicle Technologies Program Review, Jun. 8, 2010, 36 pages.

Chaudret, "Synthesis and Surface Reactivity of Organometallic Nanoparticles", Topics in Organometallic Chemistry, 2005, vol. 16, pp. 233-259.

Chen, "Effect of fabrication methods of bifunctional catalyst layers on unitized regenerative fuel cell performance", Electrochimica Acta, Sep. 30, 2009, vol. 54, No. 23, pp. 5454-5462.

Chow, "Fabrication of biologically based microstructure composites for vacuum field emission", Materials Science and Engineering A, Oct. 15, 1992, vol. 158, No. 1, pp. 1-6.

Debe, "Vacuum vapor deposited thin films of a perylene dicarboximide derivative: Microstructure versus deposition parameters", Journal of Vacuum Science & Technology A, May/Jun. 1988, vol. 6, No. 3, pp. 1907-1911.

Debe, "Effect of Gravity on Copper Phthalocyanine Thin Films III: Microstructure Comparisons of Copper Phthalocyanine Thin Films Grown in Microgravity and Unit Gravity", Thin Solid Films, May 1, 1990, vol. 186, No. 2, pp. 327-347.

Debe, "Advanced Cathode Catalysts and Supports for PEM Fuel Cells", 2010 Department of Energy Hydrogen Program Review, Project ID: FC 001, Jun. 8, 2010, 43 pages.

Gottesfeld, "Polymer Electrolyte Fuel Cells", Advances in Electrochemical Science and Engineering, vol. 5, editor Alkire, Wiley-VCH Verlag GmbH, Weinheim, Germany, pp. 235-238, 292 and 297-301 (1997).

Jang, "Attenuated degradation of a PEMFC cathode during fuel starvation by using carbon-supported $IrO_2$", Electrochimica Acta, Feb. 15, 2013, vol. 90, pp. 148-156.

Johnson, "In Situ Reactivity and TOF-SIMS Analysis of Surfaces Prepared by Soft and Reactive Landing of Mass-Selected Ions", Analytical Chemistry, Jul. 1, 2010, vol. 82, No. 13, pp. 5718-5727.

Johnson, "Preparation of Surface Organometallic Catalysts by Gas-Phase Ligand Stripping and Reactive Landing of Mass-Selected Ions", Chemistry: A European Journal Dec. 27, 2010, vol. 16, No. 48, pp. 14433-14438.

Kam, "Summary Abstract: Dramatic variation of the physical microstructure of a vapor deposited organic thin film", Journal of Vacuum Science & Technology A, Jul./Aug. 1987, vol. 5, No. 4, pp. 1914-1916.

Lee, "Measurement and Modeling of the Reflectance-Reducing Properties of Gradient Index Microstructured Surfaces", Photographic Science and Engineering, Jul./Aug. 1980, vol. 24, No. 4, pp. 211-216.

Mamaca, "Electrochemical activity of ruthenium and iridium based catalysts for oxygen evolution reaction", Applied Catalysis B: Environmental, Jan. 12, 2012, vol. 111-112, pp. 376-380.

Meille, "Review on methods to deposit catalysts on structured surfaces", Applied Catalysis A: General, 2006, vol. 315, pp. 1-17.

Oh, "The inhibition of electrochemical carbon corrosion in polymer electrolyte membrane fuel cells using iridium nanodendrites", International Journal of Hydrogen Energy, 2012, vol. 37, pp. 2455-2461.

Ohnuma, "Amorphous Ultrafine Metallic Particles Prepared by Sputtering Method", Rapidly Quenched Metals, Proceedings of the Fifth International Conference on Rapidly Quenched Metals; Steeb, Editor, Sep. 3-7, 1984, pp. 1117-1124.

Radev, "Optimization of platinum/iridium ratio in thin sputtered films for PEMFC cathodes", International Journal of Hydrogen Energy, 2012, vol. 37, pp. 7730-7735.

Sadaoka, "Effects of morphology on $NO_2$ detection in air at room temperature with phthalocyanine thin films", Journal of Materials Science, 1990, vol. 25, pp. 5257-5268.

Takasu, "A gas-diffusion cathode coated with oxide-catalyst for polymer electrolyte fuel cells using neither platinum catalyst nor carbon catalyst-support", Electrochimica Acta, 2013, vol. 105, pp. 224-229.

Tang, "High Dispersion and Electrocatalytic Properties of Platinum on Well-Aligned Carbon Nanotube Arrays," Carbon, 2004, vol. 42, pp. 191-197.

Wailes, Organometallic Chemistry of Titanium, Zirconium, and Hafnium, Chapter III "π-Bonded Derivatives of Titanium(IV)", Academic Press, Inc., Published by Elsevier Inc., pp. 30-108 (1974).

Wan, "Poly(N-vinyl-2-pyrrolidone) cluster-assembled nanostructured films prepared by low energy cluster beam deposition", Solid State Communications, 2002, vol. 121, pp. 251-256.

Wesselmark, "The impact of iridium on the stability of platinum on carbon thin-film model electrodes", Electrochimica Acta, 2013, vol. 111, pp. 152-159.

Wilson, "Thin-film catalyst layers for polymer electrolyte fuel cell electrodes", Journal of Applied Electrochemistry, 1992, vol. 22, pp. 1-7.

International Search Report for PCT International Application No. PCT/US2015/064698, dated Feb. 26, 2016, 6 pages.

* cited by examiner

MEMBRANE ELECTRODE ASSEMBLY

CROSS REFERENCE TO RELATED APPLICATIONS

This application is a national stage filing under 35 U.S.C. § 371 of PCT/US2015/064698, filed Dec. 9, 2015, which claims the benefit of U.S. Provisional Application Nos. 62/096,097, filed Dec. 23, 2014 and 62/091,851, filed Dec. 15, 2014, the disclosures of which are incorporated by reference in their entireties herein.

This invention was made with Government support under Cooperative Agreement DE-EE0000456 awarded by DOE. The Government has certain rights in this invention.

BACKGROUND

A proton exchange membrane fuel cell, also known as a polymer electrolyte membrane (PEM) fuel cell (PEMFC) converts electrochemical energy released during the hydrogen and oxygen electrode reactions in to electrical energy. A stream of hydrogen is delivered to the anode side of the membrane electrode assembly (MEA). The half-cell reaction at the anode, the hydrogen oxidation reaction (HOR), splits hydrogen in to protons and electrons. The newly generated protons permeate through the polymer electrolyte membrane to the cathode side. The electrons travel along an external load circuit to the cathode side of the MEA, thus creating the current output of the fuel cell. Meanwhile, a stream of oxygen (typically in air) is delivered to the cathode side of the MEA. At the cathode side, oxygen molecules are reduced by the electrons arriving through the external circuit and combine with the protons permeating through the polymer electrolyte membrane to form water molecules. This cathodic half-cell reaction is an oxygen reduction reaction (ORR). Both half-cell reactions are typically catalyzed by platinum based materials. Each cell produces about 1.1 volt, so to reach the desired voltage for a particular application the cells are combined to produce stacks. The cells are separated by bipolar plates which also provide a hydrogen fuel distribution channel, as well as providing a method of extracting the current. PEM fuel cells are considered to have the highest energy density of all the fuel cells, and due to the nature of the reactions, have the quickest start up time (less than 1 second). Therefore, they tend to be favored for applications such as vehicles, portable power, and backup power applications.

A PEM fuel cell operating in an automotive application typically undergoes thousands of start-up/shut-down events over multiple years of operation. During these transient periods of repeated fuel cell start up/shut down cycles, and also during other abnormal fuel cell operation conditions (e.g., a cell reversal caused by local fuel starvation), the electrodes can be driven temporarily to relatively high positive potentials, significantly beyond their normal operational values and beyond the thermodynamic stability of water (i.e., >1.23 volt). These transient high potential pulses can lead to degradation of the catalyst layer. Corrosion of the carbon support can also occur for carbon supported catalysts.

Incorporation of oxygen evolution reaction (OER) catalysts to favor water electrolysis over carbon corrosion or catalyst degradation/dissolution is a relatively new material-based strategy for achieving fuel cell durability during transient conditions by reducing cell voltage. Ru has been observed to exhibit excellent OER activity but it is preferably stabilized. Ir is well known for being able to stabilize Ru, while Ir itself has been observed to exhibit good OER activity.

Before start-up, the anode flow field is typically filled with air. During the fuel cell start-up, the gas switches from air to hydrogen, resulting in an Hz-air front that moves through the anode flow field. When the fuel cell is shut-down, an Hz-air front formed by the gas switching moves through the anode flow field in the reverse direction. It is known that hydrogen and oxygen within the moving Hz-air front can recombine and produce water, especially when a catalyst such as platinum is present. This reaction can be relatively violent.

It is desirable to reduce the negative effects of the gas switching on the MEA performance.

SUMMARY

In one aspect, the present disclosure provides a membrane electrode assembly comprising, in order:

a first gas distribution layer;
optionally a first gas dispersion layer;
an anode catalyst layer comprising a first catalyst;
a membrane;
a cathode catalyst layer comprising a second catalyst;
optionally a second gas dispersion layer; and
a second gas distribution layer, wherein the first gas distribution layer has first and second generally opposed major surfaces;

wherein the anode catalyst layer has first and second generally opposed major surfaces, wherein the second major surface of the first gas distribution layer is closer to the first major surface of the anode catalyst layer than to the second major surface of the first anode catalyst layer;

wherein the membrane has first and second generally opposed major surfaces, wherein the second major surface of the anode catalyst layer is closer to the first major surface of the membrane than to the second major surface of the membrane;

wherein the cathode catalyst layer has first and second generally opposed major surfaces, wherein the second major surface of the membrane is closer to the first major surface of the cathode catalyst layer than to the second major surface of the cathode catalyst layer; and wherein the second gas distribution layer has first and second generally opposed major surfaces, wherein the second major surface of the cathode catalyst layer is closer to the first major surface of the second gas distribution layer than to the second major surface of the second gas distribution layer, wherein there is at least one of:
a layer comprising oxygen evolution reaction catalyst disposed on the first major surface of the first gas distribution layer;
the first gas distribution layer comprising oxygen evolution reaction catalyst;
a layer comprising oxygen evolution reaction catalyst disposed on the second major surface of the first gas distribution layer;
a layer comprising oxygen evolution reaction catalyst disposed between the first gas distribution layer and the first gas dispersion layer;
a layer comprising oxygen evolution reaction catalyst disposed on the first major surface of the first gas dispersion layer;
the first gas dispersion layer comprising oxygen evolution reaction catalyst;

a layer comprising oxygen evolution reaction catalyst disposed on the second major surface of the first gas dispersion layer;

a layer comprising oxygen evolution reaction catalyst disposed on the first major surface of the second gas dispersion layer;

the second gas dispersion layer comprising oxygen evolution reaction catalyst;

a layer comprising oxygen evolution reaction catalyst disposed on the second major surface of the second gas dispersion layer;

a layer comprising oxygen evolution reaction catalyst disposed between the second gas distribution layer and the second gas dispersion layer;

a layer comprising oxygen evolution reaction catalyst disposed on the first major surface of the second gas distribution layer;

the second gas distribution layer comprising oxygen evolution reaction catalyst; and a layer comprising oxygen evolution reaction catalyst disposed on the second major surface of the second gas distribution layer.

It has been found, unexpectedly, that by physically separating the oxygen evolution reaction (OER) catalyst (e.g., Ru, Ir, RuIr, or their oxides) from the Pt-based hydrogen oxidation reaction (HOR) catalyst on the anode side or the Pt-based oxygen reduction reaction (ORR) catalyst on the cathode side of a hydrogen PEM fuel cell, a substantial improvement in catalyst durability for gas switching events such as startup/shutdown or cell reversal (due to local fuel starvation) can be achieved. A further advantage of membrane electrode assemblies (MEAs) described herein is that OER catalyst can be varied independently of the choice of anode and cathode catalyst layers applied to the polymer electrolyte membrane. Thus, the OER catalyst can be used with catalyst coated membranes having a variety of HOR and ORR catalyst layers, such as Pt supported on carbon or Pt on nanostructured thin film supports. The OER catalyst loading, processing, and performance-enhancing additives can be adjusted to meet the specific customer's needs for their particular anode, cathode, hold requirements, etc. This approach also permits a variety of catalyst coated membrane (CCM) and MEA constructions in which OER catalyst on or in the gas distribution layer or gas dispersion layer is one component, in addition to which another layer of catalyst is added.

Membrane electrode assemblies described herein are useful, for example, in fuel cells.

DETAILED DESCRIPTION

Figure 1:
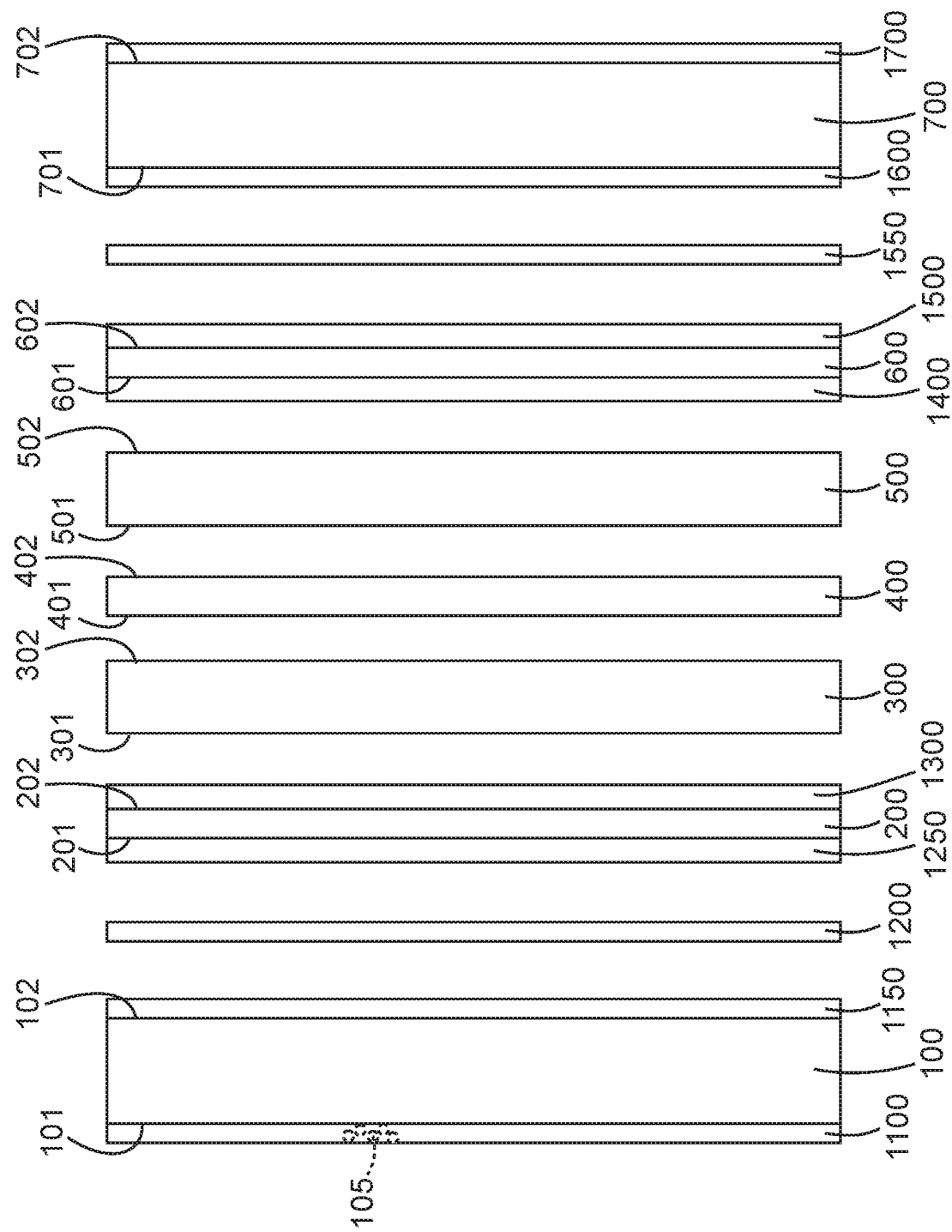
FIG. 1 is a schematic of exemplary embodiments of membrane electrode assemblies described herein.

Referring to FIG. 1, an exemplary membrane electrode assembly described herein comprises, in order, first gas distribution layer 100, optional first gas dispersion layer 200, anode catalyst layer 300 comprising first catalyst, membrane 400, cathode catalyst layer 500 comprising second catalyst, optional second gas dispersion layer 600, and second gas distribution layer 700.

First gas distribution layer 100 has first and second generally opposed major surfaces 101, 102. Anode catalyst layer 300 has first and second generally opposed major surfaces 301, 302. Second major surface 102 of first gas distribution layer 100 is closer to first major surface 301 of anode catalyst layer 300 than to second major surface 302 of first anode catalyst layer 300.

Membrane 400 has first and second generally opposed major surfaces 401, 402. Second major surface 302 of anode catalyst layer 300 is closer to first major surface of membrane 401 than to second major surface 402 of the membrane 400. Cathode catalyst layer 500 has first and second generally opposed major surfaces 501, 502. Second major surface 402 of membrane 400 is closer to first major surface 501 of cathode catalyst layer 500 than to second major surface 502 of cathode catalyst layer 500.

Second gas distribution layer 700 has first and second generally opposed major surfaces 701, 702. Second major surface 502 of cathode catalyst layer 500 is closer to first major surface 701 of second gas distribution layer 700 than to second major surface 702 of second gas distribution layer 700.

Exemplary membrane electrode assembly 9 also has at least one of:

layer 1100 comprising oxygen evolution reaction (OER) catalyst disposed on first major surface 101 of first gas distribution layer 100;

first gas distribution layer 100 comprising oxygen evolution reaction catalyst;

layer 1150 comprising oxygen evolution reaction catalyst disposed on second major surface 102 of first gas distribution layer 100;

layer 1200 comprising oxygen evolution reaction catalyst disposed between first gas distribution layer 100 and first gas dispersion layer 200;

layer 1250 comprising oxygen evolution reaction catalyst disposed on first major surface 201 of first gas dispersion layer 200;

first gas dispersion layer 200 comprising oxygen evolution reaction catalyst;

layer 1300 comprising oxygen evolution reaction catalyst disposed on second major surface 202 of first gas dispersion layer 200;

layer 1400 comprising oxygen evolution reaction catalyst disposed on first major surface 601 of second gas dispersion layer 600;

second gas dispersion layer 600 comprising oxygen evolution reaction catalyst;

layer 1500 comprising oxygen evolution reaction catalyst disposed on second major surface 602 of second gas dispersion layer 600;

layer 1550 comprising oxygen evolution reaction catalyst disposed between second gas distribution layer 600 and second gas dispersion layer 700;

layer 1600 comprising oxygen evolution reaction catalyst disposed on first major surface 701 of second gas distribution layer 700;

second gas distribution layer 700 comprising oxygen evolution reaction catalyst; and layer 1700 comprising oxygen evolution reaction catalyst disposed on second major surface 702 of second gas distribution layer 700. As shown, oxygen evolution reaction catalyst is present in layer 1100.

Oxygen evolution reaction catalyst 105 is preferably adapted to be in electrical contact with an external circuit when the membrane electrode assembly (MEA) is used in an electrochemical device such as a fuel cell. This is possible because, in many polymer electrolyte membrane (PEM) fuel cell constructions, first gas distribution layer 100 and second gas distribution layer 700 are electrically conductive.

Although not wanting to be bound by theory, it is believed that for a successful incorporation of OER catalysts, it is desired to prevent them from blocking or affecting the Pt hydrogen oxidation reaction (HOR), or vice versa.

Membrane electrode assemblies described herein, as well as devices incorporating membrane electrode assemblies described herein, are generally made using techniques known in the art, but modified with the constructions requirements or options described herein.

The gas distribution layer generally delivers gas evenly to the electrodes and in some embodiments conducts electricity. It also provides removal of water in either vapor or liquid form. An exemplary gas distribution layer is a gas diffusion layer, also sometimes referred to as a macro-porous gas diffusion backing (GDB). Sources of gas distribution layers include carbon fibers randomly oriented to form porous layers, in the form of non-woven paper or woven fabrics. The non-woven carbon papers are available, for example, from Mitsubishi Rayon Co., Ltd., Tokyo, Japan, under the trade designation "GRAFIL U-105;" Toray Corp., Tokyo, Japan, under the trade designation "TORAY;" AvCarb Material Solutions, Lowell, Mass. under the trade designation "AVCARB;" SGL Group, the Carbon Company, Wiesbaden, Germany, under trade designation "SIGRACET;" Freudenberg FCCT SE & Co. KG, Fuel Cell Component Technologies, Weinheim, Germany, under trade designation "Freudenberg;" and Engineered Fibers Technology (EFT), Shelton, Conn., under trade designation "Spectracarb GDL." The woven carbon fabrics or cloths are available, for example, from ElectroChem., Inc. Woburn, Mass., under the trade designation "EC-CC1-060" and "EC-AC-CLOTH;" NuVant Systems Inc. Crown Point, Ind., under the trade designations "ELAT-LT" and "ELAT;" BASF Fuel Cell GmbH, North America, under the trade designation "E-TEK ELAT LT;" and Zoltek Corp., St. Louis, Mo., under the trade designation "ZOLTEK CARBON CLOTH."

The gas dispersion layer further distributes the gas generally more evenly to the electrode, generally protects the catalyst layer and membrane from mechanical defects owing to the possible roughness of the gas distribution layer, and in some embodiments conducts electricity and reduces the electrical contact resistance with the adjacent catalyst layer. It also may provide effective wicking of liquid water from the catalyst layer in to the diffusion layer. An exemplary gas dispersion layer is a microporous layer. Microporous layers can be formed, for example, by impregnating or/and coating a gas distribution layer such carbon papers or cloths with additives such as water repelling hydrophobic binding agents (e.g., fluoropolymers or fluorinated ethylene propylene resin FEP) and carbon black. Carbon papers or cloths are typically first immersed in a dispersed solution/emulsion of a water repellent hydrophobic agent, in a solvent (e.g., water or alcohol), followed by drying and thermal treatment; then a carbon slurry is coated on the substrate followed by drying and thermal treatment. Exemplary fluoropolymers such as PTFE (polytetrafluoroethylene), available, for example, from Ensinger GmbH, Nufringen, Germany, under the trade designation "TECAFLON PTFE NATURAL;" 3M Dyneon, St. Paul, Minn., under the trade designation "3M DYNEON PTFE TF;" Baillie Advanced Materials LLC, Edinburgh, United Kingdom, under the trade designation "BAM PTFE;" and E.I. du Pont de Nemours, Wilmington, Del., under the trade designations "DUPONT PTFE" and "DUPONT TEFLON ETFE" (poly(ethene-co-tetrafluoroethene), available from Ensinger GmbH under the trade designation "TECAFLON ETFE NATURAL;" 3M Dyneon, under the trade designation "3M DYNEON;" ETFE (fluorothermoplastic) available, for example, from Baillie Advanced Materials LLC under the trade designation "BAM ETFE;" and E.I. du Pont de Nemours under the trade designation "DUPONT ETFE;" and PVDF (poly-vinylidenefluoride), available, for example, from Ensinger GmbH under the trade designation "TECAFLON PVDF;" 3M Dyneon under the trade designation "3M DYNEON FLUOROPLASTIC PVDF;" and Baillie Advanced Materials LLC under the trade designation "BAM PVDF." Exemplary sources fluorinated ethylene propylene resin FEP are available from E.I. du Pont de Nemours under the trade designation "DuPont Teflon FEP" and Daikin North America LLC under the trade designation "NEOFLON Dispersion" (FEP-based/PFA-based). Exemplary sources of a carbon black powder include Acetylene Black, available from manufacturers including Alfa Aesar, Ward Hill, Mass., or oil furnace carbon black, which is available from Cabot Corporation, Boston, Mass., under the trade designation "VULCAN XC-72."

Exemplary membranes include polymer electrolyte membranes. Exemplary polymer electrolytes membranes include those comprising anionic functional groups bound to a common backbone, which are typically sulfonic acid groups, but may also include carboxylic acid groups, imide groups, amide groups, or other acidic functional groups. The polymer electrolytes used in making membrane electrode assemblies described herein are typically highly fluorinated, and more typically perfluorinated. The polymer electrolytes used in making membrane electrode assemblies described herein are typically copolymers of tetrafluoroethylene and at least fluorinated, acid-functional comonomers. Exemplary polymer electrolytes include those from E.I. du Pont de Nemours, Wilmington, Del., under the trade designation "NAFION" and from Asahi Glass Co. Ltd., Japan, under the trade designation "FLEMION". The polymer electrolyte may be a copolymer of tetrafluoroethylene (TFE) and $FSO_2CF_2CF_2CF_2CF_2$—O—$CF$=$CF_2$ as described, for example, in U.S. Pat. No. 6,624,328 (Guerra) and U.S. Pat. No. 7,348,088 (Freemeyer et al.), the disclosures of which are incorporated herein by reference. The polymer typically has an equivalent weight (EW) of 1200 or less, 1100 or less, 1000 or less, 900 or less, or even 800 or less.

An oxygen evolution reaction electrocatalyst participates in electrochemical oxygen evolution reactions. Catalyst materials modify and increase the rate of chemical reactions without being consumed in the process. Electrocatalysts are a specific form of catalysts that function at electrode surfaces or may be the electrode surface itself. An electrocatalyst can be heterogeneous such as an iridium surface, coating or nanoparticles, or homogeneous like a dissolved coordination complex. The electrocatalyst assists in transferring electrons between the electrode and reactants, and/or facilitates an intermediate chemical transformation described by an overall half-reaction.

In general, the oxygen evolution reaction catalyst can be deposited by techniques known in the art. Exemplary deposition techniques include those independently selected from the group consisting of sputtering (including reactive sputtering), atomic layer deposition, molecular organic chemical vapor deposition, molecular beam epitaxy, thermal physical vapor deposition, vacuum deposition by electrospray ionization, and pulse laser deposition. Additional general details can be found, for example, in U.S. Pat. No. 5,879,827 (Debe et al.), U.S. Pat. No. 6,040,077 (Debe et al.), and U.S. Pat. No. 7,419,741 (Vernstrom et al.), the disclosures of which are incorporated herein by reference. Thermal physical vapor deposition method uses suitable elevated temperature (e.g., via resistive heating, electron beam gun, or laser) to melt or sublimate the target (source material) into vapor state which is in turn passed through a vacuum space, then condensing of the vaporized form to substrate surfaces. Thermal physical vapor deposition equipment is known in the art, including that available, for example, as a metal evaporator or as an organic molecular evaporator from CreaPhys GmbH, Dresden, Germany, under the trade designations "METAL EVAPORATOR" (ME-Series) or "Organic Molecular Evaporator (DE-Series)" respectively; another example of an organic materials evaporator is available from Mantis Deposition LTD, Oxfordshire, UK, under the trade designation "ORGANIC MATERIALS EVAPORATOR (ORMA-Series)". Catalysts comprising the multiple alternating layers can be sputtered, for example, from a multiple targets (e.g., Ir is sputtered from a first target, Pd is sputtered from a second target, Ru from a third (if present), etc.), or from a target(s) comprising more than one element. If the catalyst coating is done with a single target, it may be desirable that the coating layer be applied in a single step on to the GDL so that the heat of condensation of the catalyst coating heats the Au, Co, Fe, Ir, Mn, Ni, Os, Pd, Pt, Rh, or Ru, etc. atoms as applicable and substrate surface sufficient to provide enough surface mobility that the atoms are well mixed and form thermodynamically stable alloy domains. Alternatively, for example, the substrate can also be provided hot or heated to facilitate this atomic mobility. In some embodiments, sputtering is conducted at least in part in an atmosphere comprising at least a mixture of argon and oxygen, and wherein the ratio of argon to oxygen flow rates into the sputtering chamber are at least 113 sccm/7 sccm (standard cubic centimeters per minute). Organometallic forms of catalysts can be deposited, for example, by soft or reactive landing of mass selected ions. Soft landing of mass-selected ions is used to transfer catalytically-active metal complexes complete with organic ligands from the gas phase onto an inert surface. This method can be used to prepare materials with defined active sites and thus achieve molecular design of surfaces in a highly controlled way under either ambient or traditional vacuum conditions. For additional details see, for example, Johnson et al., Anal. Chem 2010, 82, 5718-5727, and Johnson et al., Chemistry: A European Journal 2010, 16, 14433-14438, the disclosures of which are incorporated herein by reference.

Exemplary catalysts contained in the anode catalyst layer include at least one of:

(a) at least one of elemental Au, Co, Fe, Ir, Mn, Ni, Os, Pd, Pt, Rh, or Ru;

(b) at least one alloy comprising at least one of Au, Co, Fe, Ir, Mn, Ni, Os, Pd, Pt, Rh, or Ru;

(c) at least one composite comprising at least one of Au, Co, Fe, Ir, Mn, Ni, Os, Pd, Pt, Rh, or Ru;

(d) at least one oxide, hydrated oxide or hydroxide of at least one of Au, Co, Fe, Ir, Mn, Ni, Os, Pd, Pt, Rh, or Ru;

(e) at least one organometallic complex of at least one of Au, Co, Fe, Ir, Mn, Ni, Os, Pd, Pt, Rh, or Ru;

(f) at least one carbide of at least one of Au, Co, Fe, Ir, Mn, Ni, Os, Pd, Pt, Rh, or Ru;

(g) at least one fluoride of at least one of Au, Co, Fe, Ir, Mn, Ni, Os, Pd, Pt, Rh, or Ru;

(h) at least one nitride of at least one of Au, Co, Fe, Ir, Mn, Ni, Os, Pd, Pt, Rh, or Ru;

(i) at least one boride of at least one of Au, Co, Fe, Ir, Mn, Ni, Os, Pd, Pt, Rh, or Ru;

(j) at least one oxycarbide of at least one of Au, Co, Fe, Ir, Mn, Ni, Os, Pd, Pt, Rh, or Ru;

(k) at least one oxyfluoride of at least one of Au, Co, Fe, Ir, Mn, Ni, Os, Pd, Pt, Rh, or Ru;

(l) at least one oxynitride of at least one of Au, Co, Fe, Ir, Mn, Ni, Os, Pd, Pt, Rh, or Ru; or (m) at least one oxyboride of at least one of Au, Co, Fe, Ir, Mn, Ni, Os, Pd, Pt, Rh, or Ru (where it is understood that the oxides, organometallic complexes, borides, carbides, fluorides, nitrides, oxyborides, oxycarbides, oxyfluorides, and oxynitrides are those that exist with Au, Co, Fe, Ir, Mn, Ni, Os, Pd, Pt, Rh, or Ru).

Exemplary oxides include $CoO$, $C_2O_3$, $Co_3O_4$, $CoFe_2O_4$, $FeO$, $Fe_2O_3$, $Fe_3O_4$, $Fe_4O_5$, $NiO$, $Ni_2O_3$, $Ni_xFe_yO_z$, $Ni_xCo_yO_z$, $MnO$, $Mn_2O_3$, $Mn_3O_4$, $Ir_xO_y$ where Ir valence could be, for example, 2-8. Specific exemplary Ir oxides include $Ir_2O_3$, $IrO_2$, $IrO_3$, and $IrO_4$, as well as mixed $Ir_xRu_yO_z$, $Ir_xPt_yO_z$, $Ir_xRh_yO_z$, $Ir_xRu_yPt_zO_{zz}$, $Ir_xRh_yPt_zO_{zz}$, $Ir_xPd_yPt_zO_{zz}$, $Ir_xPd_yO_z$, $Ir_xRu_yPd_zO_{zz}$, $Ir_xRh_yPd_zO_{zz}$, or iridate Ir—Ru pyrochlore oxide (e.g., $Na_xCe_yIr_zRu_{zz}O_7$); Ru oxides include $Ru_{x1}O_{y1}$, where valence could be, for example, 2-8. Specific exemplary Ru oxides include $Ru_2O_3$, $RuO_2$, and $RuO_3$, or ruthenate Ru—Ir pyrochlore oxide (e.g., $Na_xCe_yRu_zIr_{zz}O_7$). Exemplary Pd oxides include $Pd_xO_y$ forms where Pd valence could be, for example, 1, 2, and 4. Specific exemplary Pd oxides include $PdO$, $PdO_2$. Other oxides include Os, Rh, or Au oxides $OsO_2$, $OsO_4$, $RhO$, $RhO_2$, $Rh_2O_3$, $Rh_xO_y$ and $Au_2O_3$, $Au_2O$, and $Au_xO_y$. Exemplary organometallic complexes include at least one of Au, Co, Fe, Ni, Ir, Pd, Rh, Os, or Ru, where Au, Co, Fe, Ir, Ni, Pd, Pt, Rh, or Ru form coordination bonds with organic ligands through heteroatom(s) or non-carbon atom(s) (e.g., oxygen, nitrogen, chalcogens (e.g., sulfur and selenium), phosphorus, or halide). Exemplary Au, Co, Fe, Ir, Ni, Pd, Pt, Rh, Os, or Ru complexes with organic ligands can also be formed via π bonds. Organic ligands with oxygen hetero-atoms include functional groups such as hydroxyl, ether, carbonyl, ester, carboxyl, aldehydes, anhydrides, cyclic anhydrides, and epoxy. Organic ligands with nitrogen hetero atoms include functional groups such as amine, amide, imide, imine, azide, azine, pyrrole, pyridine, porphyrine, isocyanate, carbamate, carbamide sulfamate, sulfamide, amino acids, and N-heterocyclic carbine. Organic ligands with sulfur hetero atoms, so-called thio-ligands, include functional groups such as thiol, thioketone (thione or thiocarbonyl), thial, thiophene, disulfides, polysulfides, sulfimide, sulfoximide, and sulfonediimine. Organic ligands with phosphorus hetero-atoms include functional groups such as phosphine, phosphane, phosphanido, and phosphinidene. Exemplary organometallic complexes also include homo and hetero bimetallic complexes where Au, Co, Fe, Ir, Ni, Pd, Pt, Rh, Os, or Ru are involved in coordination bonds with either homo or hetero functional organic ligands. Au, Co, Fe, Ir, Ni, Pd, Pt, Rh, Os, or Ru organometallic complexes formed via in coordination bonds include carbon rich 2-conjugated organic ligands (e.g., arenes, allyls, dienes, carbenes, and alkynyls). Examples of Au, Co, Fe, Ir, Ni, Pd, Pt, Rh, Os or Ru organometallic complexes are also known as chelates, tweezer molecules, cages, molecular boxes, fluxional molecules, macrocycles, prism, half-sandwich, and metal-organic framework (MOF). Exemplary organometallic compounds comprising at least one of Au, Co, Fe, Ir, Ni, Pd, Pt, Rh, Os, or Ru include compounds where Au, Co, Fe, Ir, Ni, Pd, Pt, Rh, Os, or Ru bond to organics via covalent, ionic or mixed covalent-ionic metal-carbon bonds. Exemplary organometallic compounds can also include a combination of at least two of Au, Co, Fe, Ir, Ni, Pd, Pt, Rh, Os, or Ru covalent bonds to carbon atoms and coordination bonds to organic ligands via hetero-atoms (e.g., oxygen, nitrogen, chalcogens (e.g., sulfur and selenium), phosphorus, or halide). Formulae of stable metallo-organic complexes can typically be predicted from the 18-electron rule. The rule is based on the fact that the valence shells of transition metals consist of nine valence orbitals, which collectively can accommodate 18 electrons as either bonding or nonbonding electron pairs. The combination of these nine atomic orbitals with ligand orbitals creates nine molecular orbitals that are either metal-ligand bonding or non-bonding. The rule is not generally applicable for complexes of non-transition metals. The rule usefully predicts the formulae for low-spin complexes of the Cr, Mn, Fe, and Co triads. Well-known examples include ferrocene, iron pentacarbonyl, chromium carbonyl, and nickel carbonyl. Ligands in a complex determine the applicability of the 18-electron rule. In general, complexes that obey the rule are composed at least partly of "π-acceptor ligands" (also known as π-acids). This kind of ligand exerts a very strong ligand field, which lowers the energies of the resultant molecular orbitals and thus are favorably occupied. Typical ligands include olefins, phosphines, and CO. Complexes of π-acids typically feature metal in a low-oxidation state. The relationship between oxidation state and the nature of the ligands is rationalized within the framework of π backbonding. Exemplary carbides include $Au_2C_2$, $Ni_2C$, $Ni_3C$, NiC, $Fe_2C$, $Fe_3C$, $Fe_xC_y$, CoC, $Co_2C$, $Co_3C$, IrC, $IrC_2$, $IrC_4$, $Ir_4C_5$, $Ir_xC_y$, RuC, $Ru_2C$, RhC, PtC, OsC, $OsC_3$, $OsC_2$, $(MnFe)_3C$, and $Mn_3C$. Exemplary fluorides include AuF, $AuF_3$, $AuF_5$, $FeF_2$, $FeF_3$, $CoFe_2$, $CoF_3$, $NiF_2$, $IrF_3$, $IrF_4$, $Ir_xF_y$, $PdF_3$, $PdF_4$, $RhF_3$, $RhF_4$, $RhF_6$ $RuF_3$, and $OsF_6$. Exemplary nitrides include $Au_3N$, $AuN_2$, $Au_xN_y$, $Ni_3N$, NiN, $Co_2N$, CoN, $Co_2N_3$, $Co_4N$, $Fe_2N$, $Fe_3N_x$ with x=0.75-1.4, $Fe_4N$, $Fe_8N$, $Fe_{16}N_2$, IrN, $IrN_2$,$IrN_3$, RhN, $RhN_2$, $RhN_3$, $Ru_2N$, RuN, $RuN_2$, PdN, $PdN_2$, OsN, $OsN_2$, $OsN_4$, $Mn_2N$, $Mn_4N$, and $Mn_3N$. Exemplary borides include $Au_xB_y$, $Mn_2AuB$, NiB, $Ni_3B$, $Ni_4B_3$, CoB, $Co_2B$, $Co_3B$, FeB, $Fe_2B$, $Ru_2B_3$, $RuB_2$, IrB, $Ir_xB_y$, OsB, $Os_2B_3$, $OsB_2$, RhB, $ZrRh_3B$, $NbRh_3B$ and $YRh_3B$. Exemplary oxycarbides $Au_xO_yC_z$, $Ni_xO_yC_z$, $Fe_xO_yC_z$, $Co_xO_yC_z$, $Ir_xO_yC_z$, $Ru_xO_yC_z$, $Rh_xO_yC_z$, $Pt_xO_yC_z$, $Pd_xO_yC_z$, and $Os_xO_yC_z$. Exemplary oxyfluorides include $Au_xO_yF_z$, $Ni_xO_yF_z$, $Fe_xO_yF_z$, $Co_xO_yF_z$, $Ir_xO_yF_z$, $Ru_xO_yF_z$, $Rh_xO_yF_z$, $Pt_xO_yF_z$, $Pd_xO_yF_z$, and $Os_xO_yF_z$. Exemplary oxynitrides include $Au_xO_yN_z$, $Ni_xO_yN_z$, $Fe_xO_yN_z$, $Co_xO_yN_z$, $Ir_xO_yN_z$, $Ru_xO_yN_z$, $Rh_xO_yN_z$, $Pt_xO_yN_z$, $Pd_xO_yN_z$, and $Os_xO_yN_z$. Exemplary oxyborides include $Au_xO_yB_z$, $Ni_xO_yB_z$, $Fe_xO_yB_z$, $Co_xO_yB_z$, $Ir_xO_yB_z$, $Ru_xO_yB_z$, $Rh_xO_yB_z$, $Pt_xO_yB_z$, $Pd_xO_yB_z$, and $Os_xO_yB_z$. It is within the scope of the present disclosure to include composites comprising these oxides, organometallic complexes, carbides, fluorides, nitrides, oxycarbides, oxyfluorides, oxynitrides oxyborides, boronitrides, and/or borocarbides.

Exemplary catalysts contained in the cathode catalyst layer include at least one of:

(a") at least one of elemental Au, Co, Fe, Ir, Mn, Ni, Os, Pd, Pt, Rh, or Ru;

(b") at least one alloy comprising at least one of Au, Co, Fe, Ir, Mn, Ni, Os, Pd, Pt, Rh, or Ru;

(c") at least one composite comprising at least one of Au, Co, Fe, Ir, Mn, Ni, Os, Pd, Pt, Rh, or Ru;

(d") at least one oxide of at least one of Au, Co, Fe, Ir, Mn, Ni, Os, Pd, Pt, Rh, or Ru;

(e") at least one organometallic complex of at least one of Au, Co, Fe, Ir, Mn, Ni, Os, Pd, Pt, Rh, or Ru;

(f") at least one carbide of at least one of Au, Co, Fe, Ir, Mn, Ni, Os, Pd, Pt, Rh, or Ru;

(g") at least one fluoride of at least one of Au, Co, Fe, Ir, Mn, Ni, Os, Pd, Pt, Rh, or Ru;

(h") at least one nitride of at least one of Au, Co, Fe, Ir, Mn, Ni, Os, Pd, Pt, Rh, or Ru;

(i") at least one boride of at least one of Au, Co, Fe, Ir, Mn, Ni, Os, Pd, Pt, Rh, or Ru;

(j") at least one oxycarbide of at least one of Au, Co, Fe, Ir, Mn, Ni, Os, Pd, Pt, Rh, or Ru;

(k") at least one oxyfluoride of at least one of Au, Co, Fe, Ir, Mn, Ni, Os, Pd, Pt, Rh, or Ru; or (l") at least one oxynitride of at least one of Au, Co, Fe, Ir, Mn, Ni, Os, Pd, Pt, Rh, or Ru; or (m") at least one oxyboride of at least one of Au, Co, Fe, Ir, Mn, Ni, Os, Pd, Pt, Rh, or Ru (where it is understood that the oxides, organometallic complexes, borides, carbides, fluorides, nitrides, oxyborides, oxycarbides, oxyfluorides, and oxynitrides are those that exist with Au, Co, Fe, Ir, Mn, Ni, Os, Pd, Pt, Rh, or Ru).

Exemplary oxides include CoO, $C_2O_3$, $Co_3O_4$, $CoFe_2O_4$, FeO, $Fe_2O_3$, $Fe_3O_4$, $Fe_4O_5$, NiO, $Ni_2O_3$, $Ni_xFe_yO_z$, $Ni_xCo_yO_z$; MnO, $Mn_2O_3$, $Mn_3O_4$, and $Ir_xO_y$, where Ir valence could be, for example, 2-8. Specific exemplary Ir oxides include $Ir_2O_3$, $IrO_2$, $IrO_3$, and $IrO_4$, as well as mixed $Ir_xRu_yO_z$, $Ir_xPt_yO_z$, $Ir_xRh_yO_z$, $Ir_xRu_yPt_zO_{zz}$, $Ir_xRh_yPt_zO_{zz}$, $Ir_xPd_yPt_zO_{zz}$, $Ir_xPd_yO_z$, $Ir_xRu_yPd_zO_{zz}$, $Ir_xRh_yPd_zO_{zz}$, or iridate Ir—Ru pyrochlore oxide (e.g., $Na_xCe_yIr_zRu_{zz}O_7$); Ru oxides include $Ru_{x1}O_{y1}$, where valence could be, for example, 2-8. Specific exemplary Ru oxides include $Ru_2O_3$, $RuO_2$, and $RuO_3$, or ruthenate Ru—Ir pyrochlore oxide (e.g., $Na_xCe_yRu_zIr_{zz}O_7$). Exemplary Pd oxides include $Pd_xO_y$ forms where Pd valence could be, for example, 1, 2, and 4. Specific exemplary Pd oxides include PdO, $PdO_2$, Os oxides $OsO_2$ and $OsO_4$, RhO, $RhO_2$, $Rh_2O_3$, $Au_2O_3$, $Au_2O$, and $Au_xO_y$. Exemplary organometallic complexes include at least one of Au, Co, Fe, Ni, Ir, Mn, Pd, Pt, Rh, Os, or Ru, where Au, Co, Fe, Ir, Ni, Pd, Pt, Rh, Os, or Ru coordination bonds with organic ligands through hetero-atom(s) or non-carbon atom(s) (e.g., oxygen, nitrogen, chalcogens (e.g., sulfur and selenium), phosphorus, or halide). Exemplary Au, Co, Fe, Ir, Ni, Pd, Pt, Rh, Os, or Ru complexes with organic ligands can also be formed via it bonds. Organic ligands with oxygen hetero-atoms include functional groups such as hydroxyl, ether, carbonyl, ester, carboxyl, aldehydes, anhydrides, cyclic anhydrides, and epoxy. Organic ligands with nitrogen hetero atoms include functional groups such as amine, amide, imide, imine, azide, azine, pyrrole, pyridine, porphyrine, isocyanate, carbamate, carbamide, sulfamate, sulfamide, amino acids, and N-heterocyclic carbine. Organic ligands with sulfur hetero atoms, so-called thio-ligands include functional groups (e.g., thiol, thioketone (thione or thiocarbonyl), thial, thiophene, disulfides, polysulfides, sulfimide, sulfoximide, and sulfonediimine). Organic ligands with phosphorus hetero-atoms include functional groups (e.g., phosphine, phosphane, phosphanido, and phosphinidene). Exemplary organometallic complexes also include homo and hetero bimetallic complexes where Au, Co, Fe, Ir, Ni, Pd, Pt, Rh, Os, or Ru are involved in coordination bonds with either homo or hetero functional organic ligands. Au, Co, Fe, Ir, Ni, Pd, Pt, Rh, Os, or Ru organometallic complexes formed via π coordination bonds include carbon rich π-conjugated organic ligands (e.g., arenes, allyls, dienes, carbenes, and alkynyls). Examples of Au, Co, Fe, Ir, Ni, Pd, Pt, Rh, Os, or Ru organometallic complexes are also known as chelates, tweezer molecules, cages, molecular boxes, fluxional molecules, macrocycles, prism, half-sandwich, and metal-organic framework (MOF). Exemplary organometallic compounds comprising at least one of Au, Co, Fe, Ir, Ni, Pd, Pt, Rh, Os, or Ru include compounds where Au, Co, Fe, Ir, Ni, Pd, Pt, Rh, Os, or Ru bond to organics via covalent, ionic, or mixed covalent-ionic metal-carbon bonds. Exemplary organometallic compounds can also include combinations of at least two of Au, Co, Fe, Ir, Ni, Pd, Pt, Rh, Os, or Ru covalent bonds to carbon atoms and coordination bonds to organic ligands via hetero-atoms (e.g., oxygen, nitrogen, chalcogens (e.g., sulfur and selenium), phosphorus, or halide). Formulae of stable metalloorganic complexes can typically be predicted from the 18-electron rule. The rule is based on the fact that the valence shells of transition metals consist of nine valence orbitals, which collectively can accommodate 18 electrons as either bonding or nonbonding electron pairs. The combination of these nine atomic orbitals with ligand orbitals creates nine molecular orbitals that are either metal-ligand bonding or non-bonding. The rule is not generally applicable for complexes of non-transition metals. The rule usefully predicts the formulae for low-spin complexes of the Cr, Mn, Fe, and Co triads. Well-known examples include ferrocene, iron pentacarbonyl, chromium carbonyl, and nickel carbonyl. Ligands in a complex determine the applicability of the 18-electron rule. In general, complexes that obey the rule are composed at least partly of π-acceptor ligands (also known as π-acids). This kind of ligand exerts a very strong ligand field, which lowers the energies of the resultant molecular orbitals and thus are favorably occupied. Typical ligands include olefins, phosphines, and CO. Complexes of r-acids typically feature metal in a low-oxidation state. The relationship between oxidation state and the nature of the ligands is rationalized within the framework of π backbonding. Exemplary carbides include $Au_2C_2$, or other elements carbides (e.g., $Ni_2C$, $Ni_3C$, NiC, $Fe_2C$, $Fe_3C$, $Fe_xC_y$, CoC, $Co_2C$, $Co_3C$, IrC, $IrC_2$, $IrC_4$, $Ir_4C_5$, $Ir_xC_y$, $Ru_2C$, RuC, RhC, PtC, OsC, $OsC_3$, and $OsC_2$). Exemplary fluorides include AuF, $AuF_3$, $AuF_5$, $FeF_2$, $FeF_3$, $CoFe_2$, $CoF_3$, $NiF_2$, $IrF_3$, $IrF_4$, $Ir_xF_y$, $PdF_3$, $PdF_4$, $RhF_3$, $RhF_4$, $RhF_6$, $RuF_3$, and $OsF_6$. Exemplary nitrides include $Au_3N$, $AuN_2$, $Au_xN_y$, $Ni_3N$, NiN, $Co_2N$, CoN, $Co_2N_3$, $Co_4N$, $Fe_2N$, $Fe_3N_x$ with x=0.75-1.4, $Fe_4N$, $Fe_8N$, $Fe_{16}N_2$, IrN, $IrN_2$, $IrN_3$, RhN, $RhN_2$, $RhN_3$, $Ru_2N$, RuN, $RuN_2$, PdN, $PdN_2$, OsN, $OsN_2$, and $OsN_4$. Exemplary borides include $Au_xB_y$, $Mn_2AuB$, $Ni_xBy$, CoB, $Co_2B$, $Co_3B$, FeB, $Fe_2B$, $Ru_2B_3$, $RuB_2$, IrB, $Ir_xBy$, OsB, $Os_2B_3$, $OsB_2$, RhB, and their oxyborides, boronitrides and borocarbides. Exemplary oxycarbides include $Au_xO_yC_z$, $Ni_xO_yC_z$, $Fe_xO_yC_z$, $Co_xO_yC_z$, $Ir_xO_yC_z$, $Ru_xO_yC_z$, $Rh_xO_yC_z$, $Pt_xO_yC_z$, $Pd_xO_yC_z$, and $Os_xO_yC_z$. Exemplary oxyfluorides include $Au_xO_yF_z$, $Ni_xO_yF_z$, $Fe_xO_yF_z$, $Co_xO_yF_z$, $Ir_xO_yF_z$, $Ru_xO_yF_z$, $Rh_xO_yF_z$, $Pt_xO_yF_z$, $Pd_xO_yF_z$, and $Os_xO_yF_z$. Exemplary oxynitrides include $Au_xO_yN_z$, $Ni_xO_yN_z$, $Fe_xO_yN_z$, $Co_xO_yN_z$, $Ir_xO_yN_z$, $Ru_xO_yN_z$, $Rh_xO_yN_z$, $Pt_xO_yN_z$, $Pd_xO_yN_z$, and $Os_xO_yN_z$. It is within the scope of the present disclosure to include composites comprising these oxides, organometallic complexes, carbides, fluorides, nitrides, borides, oxycarbides, oxyfluorides, oxynitrides, and/or oxyborides.

In some embodiments, the anode or cathode catalyst layer comprises nanostructured whiskers with the catalyst thereon. Nanostructured whiskers can be provided by techniques known in the art, including those described in U.S. Pat. No. 4,812,352 (Debe), U.S. Pat. No. 5,039,561 (Debe), U.S. Pat. No. 5,338,430 (Parsonage et al.), U.S. Pat. No. 6,136,412 (Spiewak et al.), and U.S. Pat. No. 7,419,741 (Vernstrom et al.), the disclosures of which are incorporated herein by reference. In general, nanostructured whiskers can be provided, for example, by vacuum depositing (e.g., by sublimation) a layer of organic or inorganic material onto a substrate (e.g., a microstructured catalyst transfer polymer sheet), and then, in the case of perylene red deposition, converting the perylene red pigment into nanostructured whiskers by thermal annealing. Typically the vacuum deposition steps are carried out at total pressures at or below about 10-3 Torr or 0.1 Pascal. Exemplary microstructures are made by thermal sublimation and vacuum annealing of the organic pigment C.I. Pigment Red 149 (i.e., N,N'-di(3,5-xylyl)perylene-3,4:9,10-bis(dicarboximide)). Methods for making organic nanostructured layers are disclosed, for example, in Materials Science and Engineering, A158 (1992), pp. 1-6; J. Vac. Sci. Technol. A, 5 (4), July/August, 1987, pp. 1914-16; J. Vac. Sci. Technol. A, 6, (3), May/August, 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August, 1980, pp. 211-16; and U.S. Pat. No. 4,340,276 (Maffitt et al.) and U.S. Pat. No. 4,568,598 (Bilkadi et al.), the disclosures of which are incorporated herein by reference. Properties of catalyst layers using carbon nanotube arrays are disclosed in the article "High Dispersion and Electrocatalytic Properties of Platinum on Well-Aligned Carbon Nanotube Arrays," Carbon 42 (2004) 191-197. Properties of catalyst layers using grassy or bristled silicon are disclosed, for example, in U.S. Pat. App. Pub. No. 2004/0048466 A1 (Gore et al.).

Vacuum deposition may be carried out in any suitable apparatus (see, e.g., U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.), and U.S. Pat. App. Pub. No. 2002/0004453 A1 (Haugen et al.), the disclosures of which are incorporated herein by reference.) One exemplary apparatus is depicted schematically in FIG. 4A of U.S. Pat. No. 5,338,430 (Parsonage et al.), and discussed in the accompanying text, wherein the substrate is mounted on a drum which is then rotated over a sublimation or evaporation source for depositing the organic precursor (e.g., perylene red pigment) prior to annealing the organic precursor in order to form the nanostructured whiskers.

Typically, the nominal thickness of deposited perylene red pigment is in a range from about 50 nm to 500 nm. Typically, the whiskers have an average cross-sectional dimension in a range from 20 nm to 60 nm and an average length in a range from 0.3 micrometer to 3 micrometers.

In some embodiments, the whiskers are attached to a backing. Exemplary backings comprise polyimide, nylon, metal foils, or other material that can withstand the thermal annealing temperature up to 300° C. In some embodiments, the backing has an average thickness in a range from 25 micrometers to 125 micrometers.

In some embodiments, the backing has a microstructure on at least one of its surfaces. In some embodiments, the microstructure is comprised of substantially uniformly shaped and sized features at least three (in some embodiments, at least four, five, ten, or more) times the average size of the nanostructured whiskers. The shapes of the microstructures can, for example, be V-shaped grooves and peaks (see, e.g., U.S. Pat. No. 6,136,412 (Spiewak et al.), the disclosure of which is incorporated herein by reference) or pyramids (see, e.g., U.S. Pat. No. 7,901,829 (Debe et al.), the disclosure of which is incorporated herein by reference). In some embodiments some fraction of the microstructure features extend above the average or majority of the microstructured peaks in a periodic fashion, such as every 31st V-groove peak being 25% or 50% or even 100% taller than those on either side of it. In some embodiments, this fraction of features extend above the majority of the microstructured peaks can be up to 10% (in some embodiments up to 3%, 2%, or even up to 1%). Use of the occasional taller microstructure features may facilitate protecting the uniformly smaller microstructure peaks when the coated substrate moves over the surfaces of rollers in a roll-to-roll coating operation. The occasional taller feature touches the surface of the roller rather than the peaks of the smaller microstructures, so much less of the nanostructured material or whisker material is likely to be scraped or otherwise disturbed as the substrate moves through the coating process. In some embodiments, the microstructure features are substantially smaller than half the thickness of the membrane that the catalyst will be transferred to in making a membrane electrode assembly. This is so that during the catalyst transfer process, the taller microstructure features do not penetrate through the membrane where they may overlap the electrode on the opposite side of the membrane. In some embodiments, the tallest microstructure features are less than $\frac{1}{3}^{rd}$ or $\frac{1}{4}^{th}$ of the membrane thickness. For the thinnest ion exchange membranes (e.g., about 10 micrometers to 15 micrometers in thickness), it may be desirable to have a substrate with microstructured features no larger than about 3 micrometers to 4.5 micrometers tall. The steepness of the sides of the V-shaped or other microstructured features or the included angles between adjacent features may in some embodiments be desirable to be on the order of 90° for ease in catalyst transfer during a lamination-transfer process and to have a gain in surface area of the electrode that comes from the square root of two (1.414) surface area of the microstructured layer relative to the planar geometric surface of the substrate backing.

In some embodiments, the anode catalyst layer comprises support materials comprising at least one of:

(a') at least one of elemental Al, carbon, Hf, Nb, Re, Si, Sn, Ta, Ti, W, or Zr;

(b') at least one alloy comprising at least one of Al, carbon, Hf, Nb, Re, Si, Sn, Ta, Ti, W, or Zr;

(c') at least one composite comprising at least one of Al, carbon, Hf, Nb, Re, Si, Sn, Ta, Ti, W, or Zr;

(d') at least one oxide of at least one of Al, Hf, Nb, Re, Si, Sn, Ta, Ti, W, or Zr;

(e') at least one organometallic complex of at least one of Al, Hf, Nb, Re, Si, Sn, Ta, Ti, W, or Zr;

(f') at least one carbide of at least one of Al, Hf, Nb, Re, Si, Sn, Ta, Ti, W, or Zr;

(g') at least one fluoride of at least one of Al, carbon, Hf, Nb, Re, Si, Sn, Ta, Ti, W, or Zr;

(h') at least one nitride of at least one of Al, carbon, Hf, Nb, Re, Si, Sn, Ta, Ti, W, or Zr;

(i') at least one oxycarbide of at least one of Al, Hf, Nb, Re, Si, Sn, Ta, Ti, W, or Zr;

(j') at least one oxyfluoride of at least one of Al, Hf, Nb, Re, Si, Sn, Ta, Ti, W, or Zr;

(k') at least one oxynitride of at least one of Al, carbon, Hf, Nb, Re, Si, Sn, Ta, Ti, W, or Zr;

(l') at least one boride of at least one of Al, carbon, Hf, Nb, Re, Si, Sn, Ta, Ti, W, or Zr; or (m') at least one oxyboride of at least one of Al, Hf, Nb, Re, Si, Sn, Ta, Ti, W, or Zr (where it is understood that the oxides, organometallic complexes, borides, carbides, fluorides, nitrides, oxyborides, oxycarbides, oxyfluorides, and oxynitrides are those that exist with Al, carbon, Hf, Nb, Re, Si, Sn, Ta, Ti, W, or Zr).

Exemplary oxides include HfO, $Hf_2O_3$, $HfO_2$, TaO, $Ta_2O_5$, SnO, $SnO_2$, TiO, $Ti_2O_3$, $TiO_2$, $Ti_xO_y$, ZrO, $Zr_2O_3$, $ZrO_2$, yttria-stabilized zirconia (YSZ), $W_2O_3$, $WO_3$, $ReO_2$, $ReO_3$, $Re_2O_3$, $Re_2O_7$, NbO, $NbO_2$, $Nb_2O_5$, $Al_2O_3$, AlO, $Al_2O$, SiO, and $SiO_2$. Exemplary organometallic complexes include at least one of Al, Hf, Nb, Re, Si, Sn, Ta, Ti, W, or Zr, where Al, Hf, Nb, Re, Si, Sn, Ta, Ti, W, or Zr form coordination bonds with organic ligands through hetero-atom(s) or non-carbon atom(s) (e.g., oxygen, nitrogen, chalcogens (e.g., sulfur and selenium), phosphorus, or halide). Exemplary Al, Hf, Nb, Re, Si, Sn, Ta, Ti, W, or Zr complexes with organic ligands can also be formed via π bonds. Organic ligands with oxygen hetero-atoms include functional groups such as hydroxyl, ether, carbonyl, ester, carboxyl, aldehydes, anhydrides, cyclic anhydrides, and epoxy. Organic ligands with nitrogen hetero atoms include functional groups such as amine, amide, imide, imine, azide, azine, pyrrole, pyridine, porphyrine, isocyanate, carbamate, carbamide, sulfamate, sulfamide, amino acids, and N-heterocyclic carbine. Organic ligands with sulfur hetero atoms, so-called thio-ligands include functional groups (e.g., thiol, thioketone (thione or thiocarbonyl), thial, thiophene, disulfides, polysulfides, sulfimide, sulfoximine, and sulfonediimine). Organic ligands with phosphorus hetero-atoms include functional groups (e.g., phosphine, phosphane, phosphanido, and phosphinidene). Exemplary organometallic complexes also include homo and hetero bimetallic complexes where Al, Hf, Nb, Re, Si, Sn, Ta, Ti, W, or Zr are involved in coordination bonds with either homo or hetero functional organic ligands. Al, Hf, Nb, Re, Si, Sn, Ta, Ti, W, or Zr organometallic complexes formed via in coordination bonds include carbon rich π-conjugated organic ligands (e.g., arenes, allyls, dienes, carbenes, and alkynyls). Examples of Al, Hf, Nb, Re, Si, Sn, Ta, Ti, W, or Zr organometallic complexes are also known as chelates, tweezer molecules, cages, molecular boxes, fluxional molecules, macrocycles, prism, half-sandwich, and metal-organic framework (MOF). Exemplary organometallic compounds comprising at least one of Al, Hf, Nb, Re, Si, Sn, Ta, Ti, W, or Zr include compounds where Al, Hf, Nb, Re, Si, Sn, Ta, Ti, W, or Zr bond to organics via covalent, ionic, or mixed covalent-ionic metal-carbon bonds. Exemplary organometallic compounds can also include combinations of at least two of Al, Hf, Nb, Re, Si, Sn, Ta, Ti, W, or Zr covalent bonds to carbon atoms and coordination bonds to organic ligands via hetero-atoms (e.g., oxygen, nitrogen, chalcogens (e.g., sulfur and selenium), phosphorus, or halide). Formulae of stable metallo-organic complexes can typically be predicted from the 18-electron rule. The rule is based on the fact that the valence shells of transition metals consist of nine valence orbitals, which collectively can accommodate 18 electrons as either bonding or nonbonding electron pairs. The combination of these nine atomic orbitals with ligand orbitals creates nine molecular orbitals that are either metal-ligand bonding or non-bonding. The rule is not generally applicable for complexes of non-transition metals. Ligands in a complex determine the applicability of the 18-electron rule. In general, complexes that obey the rule are composed at least partly of π-acceptor ligands (also known as π-acids). This kind of ligand exerts a very strong ligand field, which lowers the energies of the resultant molecular orbitals and thus are favorably occupied. Typical ligands include olefins, phosphines, and CO. Complexes of π-acids typically feature metal in a low-oxidation state. The relationship between oxidation state and the nature of the ligands is rationalized within the framework of π backbonding. For additional details see, for example, Organometallic Chemistry of Titanium, Zirconium, and Hafnium, A volume in Organometallic Chemistry: A Series of Monographs Author(s): P. C. Wailes, ISBN: 978-0-12-730350-5. Exemplary carbides include HfC and $HfC_2$, $Nb_2C$, $Nb_4C_3$ and NbC, $Re_2C$, TaC, $Ta_4C_3$, $Ta_2C$, WC, $W_2C$, $WC_2$, $Zr_2C$, $Zr_3C_2$, $Zr_6C$, TiC, $TisC_{12}^+$ clusters, and ternary Ti—Al—C, and Ti—Sn—C carbide phases (e.g., $Ti_3AlC$, $Ti_3AlC_2$, $Ti_2AlC$, $Ti_2SnC$, $Al_4C_3$, SnC, $Sn_2C$, and $Al_4C_3$). Exemplary fluorides include $ZrF_4$, $TiF_4$, $TiF_3$, $TaF_5$, $NbF_4$, $NbF_5$, $WF_6$, $AlF_3$, $HfF_4$, CF, $CF_x$, $(CF)_x$, $SnF_2$, and $SnF_4$. Exemplary nitrides include $Hf_3N_4$, HfN, $Re_2N$, $Re_3N$, ReN, $Nb_2N$, NbN, Nb carbonitride, TaN, $Ta_2N$, $Ta_5N_6$, $Ta_3N_5$, $W_2N$, WN, $WN_2$, $Zr_3N_4$, ZrN, β-$C_3N_4$, graphitic g-$C_3N_4$, and $Si_3N_4$. Exemplary oxycarbides include $Al_xO_yC_z$, $Hf_xO_yC_z$, $Zr_xO_yC_z$, $Ti_xO_yC_z$, $Ta_xO_yC_z$, $Re_xO_yC_z$, $Nb_xO_yC_z$, $W_xO_yC_z$, and $Sn_xO_yC_z$. Exemplary oxyfluorides include $Al_xO_yF_z$, $Hf_xO_yF_z$, $Zr_xO_yF_z$, $Ti_xO_yF_z$, $Ta_xO_yF_z$, $Re_xO_yF_z$, $Nb_xO_yF_z$, $W_xO_yF_z$, and $Sn_xO_yF_z$. Exemplary oxynitrides include $Al_xO_yN_z$, $Hf_xO_yN_z$, $Zr_xO_yN_z$, $Ti_xO_yN_z$, $Ta_xO_yN_z$, $Re_xO_yN_z$, $Nb_xO_yN_z$, $W_xO_yN_z$, $C_xO_yN_x$, and $Sn_xO_yN_z$. Exemplary borides include $ZrB_2$, $TiB_2$, TaB, $TaSB_6$, $Ta_3B_4$, $TaB_2$, $NbB_2$, NbB, WB, $WB_2$, $AlB_2$, $HfB_2$, $ReB_2$, $B_4C$, $SiB_3$, $SiB_4$, $SiB_6$, and their oxyborides, boronitrides, and borocarbides. It is within the scope of the present disclosure to include composites comprising these oxides, organometallic complexes, carbides, fluorides, nitrides, oxycarbides, oxyfluorides, and/or oxynitrides. The composition and amount of various components of multicomponent catalysts can affect the performance catalyst and the overall performance of the device the catalyst is used in (e.g., too much Ti in a Pt anode catalyst was observed to lower the overall cell performance).

The catalyst and catalyst support materials can be deposited, as applicable, by techniques known in the art. Exemplary deposition techniques include those independently selected from the group consisting of sputtering (including reactive sputtering), atomic layer deposition, molecular organic chemical vapor deposition, metal-organic chemical vapor deposition, molecular beam epitaxy, thermal physical vapor deposition, vacuum deposition by electrospray ionization, and pulse laser deposition. Thermal physical vapor deposition method uses suitable desired temperature (e.g., via resistive heating, electron beam gun, or laser) to melt or sublimate the target (source material) into vapor state which is in turn passed through a vacuum space, then condensing the vaporized form to substrate surfaces. Thermal physical vapor deposition equipment is known in the art, including that available, for example, as a metal evaporator from CreaPhys GmbH under the trade designation "METAL Evaporator" (ME-Series) or as an organic materials evaporator available from Mantis Deposition LTD, Oxfordshire, UK, under the trade designation "ORGANIC MATERIALS EVAPORATIOR (ORMA-Series)". Catalysts comprising the multiple alternating layers can be sputtered, for example, from multiple targets (e.g., Nb is sputtered from a first target, Zr is sputtered from a second target, Hf from a third (if present), etc.), or from a target(s) comprising more than one element. If the catalyst coating is done with a single target, it may be desirable that the coating layer be applied in a single step onto the GDL so that the heat of condensation of the catalyst coating heats the Al, carbon, Hf, Ta, Si, Sn, Ti, Zr, or W, etc. atoms as applicable and substrate surface sufficient to provide enough surface mobility that the atoms are well mixed and form thermodynamically stable alloy domains. Alternatively, for example, the substrate can also be provided hot or heated to facilitate this atomic mobility. In some embodiments, sputtering is conducted at least in part in an atmosphere comprising at least a mixture of argon and oxygen, and wherein the ratio of argon to oxygen flow rates into the sputtering chamber are at least 113 sccm/7 sccm. Organometallic forms of catalysts and catalyst support materials can be deposited, as applicable, for example, by soft or reactive landing of mass selected ions. Soft landing of mass-selected ions is used to transfer catalytically-active metal complexes complete with organic ligands from the gas phase onto an inert surface. This method can be used to prepare materials with defined active sites and thus achieve molecular design of surfaces in a highly controlled way under either ambient or traditional vacuum conditions. For additional details see, for example, Johnson et al., Anal. Chem, 2010, 82, 5718-5727, and Johnson et al., Chemistry: A European Journal, 2010, 16, 14433-14438, the disclosures of which are incorporated herein by reference.

In some embodiments, the cathode catalyst layer comprises support materials comprising at least one of:

(a''') at least one of elemental Al, carbon, Hf, Nb, Re, Si, Sn, Ta, Ti, W, or Zr;

(b''') at least one alloy comprising at least one of Al, carbon, Hf, Nb, Re, Si, Sn, Ta, Ti, W, or Zr;

(c''') at least one composite comprising at least one of Al, carbon, Hf, Nb, Re, Si, Sn, Ta, Ti, W, or Zr;

(d''') at least one oxide of at least one of Al, Hf, Nb, Re, Si, Sn, Ta, Ti, W, or Zr;

(e''') at least one organometallic complex of at least one of Al, Hf, Nb, Re, Si, Sn, Ta, Ti, W, or Zr;

(f''') at least one carbide of at least one of Al, Hf, Nb, Re, Si, Sn, Ta, Ti, W, or Zr;

(g''') at least one fluoride of at least one of Al, carbon, Hf, Nb, Re, Si, Sn, Ta, Ti, W, or Zr;

(h''') at least one nitride of at least one of Al, carbon, Hf, Nb, Re, Si, Sn, Ta, Ti, W, or Zr;

(i''') at least one oxycarbide of at least one of Al, Hf, Nb, Re, Si, Sn, Ta, Ti, W, or Zr;

(j''') at least one oxyfluoride of at least one of Al, Hf, Nb, Re, Si, Sn, Ta, Ti, W, or Zr;

(k''') at least one oxynitride of at least one of Al, carbon, Hf, Nb, Re, Si, Sn, Ta, Ti, W, or Zr;

(l''') at least one boride of at least one of Al, carbon, Hf, Nb, Re, Si, Sn, Ta, Ti, W, or Zr; or (m''') at least one oxyboride of at least one of Al, Hf, Nb, Re, Si, Sn, Ta, Ti, W, or Zr (where it is understood that the oxides, organometallic complexes, borides, carbides, fluorides, nitrides, oxycarbides, oxyfluorides, oxyborides, and oxynitrides are those that exist with a''').

Exemplary oxides include HfO, $Hf_2O_3$, $HfO_2$, TaO, $Ta_2O_5$, SnO, $SnO_2$, TiO, $Ti_2O_3$, $TiO_2$, $Ti_xO_y$, ZrO, $Zr_2O_3$, $ZrO_2$, yttria-stabilized zirconia (YSZ), $W_2O_3$, $WO_3$, $ReO_2$, $ReO_3$, $Re_2O_3$, $Re_2O_7$, NbO, $NbO_2$, $Nb_2O_5$, $Al_2O_3$, AlO, $Al_2O$, SiO, and $SiO_2$. Exemplary organometallic complexes include at least one of Al, Hf, Nb, Re, Si, Sn, Ta, Ti, W, or Zr, where Al, Hf, Nb, Re, Si, Sn, Ta, Ti, W, or Zr form coordination bonds with organic ligands through heteroatom(s) or non-carbon atom(s) (e.g., oxygen, nitrogen, chalcogens (e.g., sulfur and selenium), phosphorus, or halide). Exemplary Al, Hf, Nb, Re, Si, Sn, Ta, Ti, W, or Zr complexes with organic ligands can also be formed via π bonds. Organic ligands with oxygen hetero-atoms include functional groups such as hydroxyl, ether, carbonyl, ester, carboxyl, aldehydes, anhydrides, cyclic anhydrides, and epoxy. Organic ligands with nitrogen hetero atoms include functional groups such as amine, amide, imide, imine, azide, azine, pyrrole, pyridine, porphyrine, isocyanate, carbamate, carbamide, sulfamate, sulfamide, amino acids, and N-heterocyclic carbine. Organic ligands with sulfur hetero atoms, so-called thio-ligands include functional groups (e.g., thiol, thioketone (thione or thiocarbonyl), thial, thiophene, disulfides, polysulfides, sulfimide, sulfoximide, and sulfonediimine). Organic ligands with phosphorus hetero-atoms include functional groups (e.g., phosphine, phosphane, phosphanido, and phosphinidene). Exemplary organometallic complexes also include homo and hetero bimetallic complexes where Al, Hf, Nb, Re, Si, Sn, Ta, Ti, W, or Zr are involved in coordination bonds with either homo or hetero functional organic ligands. Al, Hf, Nb, Re, Si, Sn, Ta, Ti, W, or Zr organometallic complexes formed via in coordination bonds include carbon rich π-conjugated organic ligands (e.g., arenes, allyls, dienes, carbenes, and alkynyls). Examples of Al, Hf, Nb, Re, Si, Sn, Ta, Ti, W, or Zr organometallic complexes are also known as chelates, tweezer molecules, cages, molecular boxes, fluxional molecules, macrocycles, prism, half-sandwich, and metal-organic framework (MOF). Exemplary organometallic compounds comprising at least one of Al, Hf, Nb, Re, Si, Sn, Ta, Ti, W, or Zr include compounds where Al, Hf, Nb, Re, Si, Sn, Ta, Ti, W, or Zr bond to organics via covalent, ionic, or mixed covalent-ionic metal-carbon bonds. Exemplary organometallic compounds can also include combinations of at least two of Al, Hf, Nb, Re, Si, Sn, Ta, Ti, W, or Zr covalent bonds to carbon atoms and coordination bonds to organic ligands via hetero-atoms (e.g., oxygen, nitrogen, chalcogens (e.g., sulfur and selenium), phosphorus, or halide). Formulae of stable metallo-organic complexes can typically be predicted from the 18-electron rule. The rule is based on the fact that the valence shells of transition metals consist of nine valence orbitals, which collectively can accommodate 18 electrons as either bonding or nonbonding electron pairs. The combination of these nine atomic orbitals with ligand orbitals creates nine molecular orbitals that are either metal-ligand bonding or non-bonding. The rule is not generally applicable for complexes of non-transition metals. Ligands in a complex determine the applicability of the 18-electron rule. In general, complexes that obey the rule are composed at least partly of π-acceptor ligands (also known as π-acids). This kind of ligand exerts a very strong ligand field, which lowers the energies of the resultant molecular orbitals and thus are favorably occupied. Typical ligands include olefins, phosphines, and CO. Complexes of r-acids typically feature metal in a low-oxidation state. The relationship between oxidation state and the nature of the ligands is rationalized within the framework of π backbonding. For additional details see, for example, Organometallic Chemistry of Titanium, Zirconium, and Hafnium, A volume in Organometallic Chemistry: A Series of Monographs, Author(s): P. C. Wailes, ISBN: 978-0-12-730350-5. Exemplary carbides include $HfC$, $HfC_2$, $Nb_2C$, $Nb_4C_3$, $NbC$, $Re_2C$, $TaC$, $Ta_4C_3$, $Ta_2C$, $WC$, $W_2C$, $WC_2$, $Zr_2C$, $Zr_3C_2$, $Zr_6C$, $TiC$, $TiSC_{12+}$ clusters, and ternary carbide phases (e.g., $Ti_3AlC$, $Ti_3AlC_2$, $Ti_2AlC$, $Ti_2SnC$, $Al_4C_3$, $SnC$, $Sn_2C$, and $Al_4C_3$). Exemplary fluorides include $ZrF_4$, $TiF_4$, $TiF_3$, $TaF_5$, $NbF_4$, $NbF_5$, $WF_6$, $AlF_3$, $HfF_4$, $CF$, $CF_x$, $(CF)_x$, $SnF_2$, and $SnF_4$. Exemplary nitrides include $Hf_3N_4$, $HfN$, $Re_2N$, $Re_3N$, $ReN$, $Nb_2N$, $NbN$, Nb carbonitride, $TaN$, $Ta_2N$, $Ta_5N_6$, $Ta_3N_5$, $W_2N$, $WN$, $WN_2$, $β-C_3N_4$, graphitic $g-C_3N_4$, $Zr_3N_4$, and $ZrN$. Exemplary oxycarbides include $Al_xO_yC_z$, $Hf_xO_yC_z$, $Zr_xO_yC_z$, $Ti_xO_yC_z$, $Ta_xO_yC_z$, $Re_xO_yC_z$, $Nb_xO_yC_z$, $W_xO_yC_z$, and $Sn_xO_yC_z$. Exemplary oxyfluorides include $Al_xO_yF_z$, $Hf_xO_yF_z$, $Zr_xO_yF_z$, $Ti_xO_yF_z$, $Ta_xO_yF_z$, $Re_xO_yF_z$, $Nb_xO_yF_z$, $W_xO_yF_z$, and $Sn_xO_yF_z$. Exemplary oxynitrides include $Al_xO_yN_z$, $Hf_xO_yN_z$, $Zr_xO_yN_z$, $Ti_xO_yN_z$, $Ta_xO_yN_z$, $Re_xO_yN_z$, $Nb_xO_yN_z$, $W_xO_yN_z$, and $Sn_xO_yN_z$. Exemplary borides include $ZrB_2$, $TiB_2$, $TaB$, $TasB_6$, $Ta_3B_4$, $TaB_2$, $NbB_2$, $NbB$, $WB$, $WB_2$, $AlB_2$, $HfB_2$, $ReB_2$, $C_4B$, $SiB_3$, $SiB_4$, $SiB_6$, and their boronitrides and borocarbides. It is within the scope of the present disclosure to include composites comprising these oxides, organometallic complexes, carbides, fluorides, nitrides, oxycarbides, oxyfluorides, and/or oxynitrides.

The process of providing or incorporating the catalyst and the catalyst support layer into the GDL can also be based on a liquid phase. Suitable coating methods include suspension, electrophoretic, or electrochemical deposition and impregnation. For example, when the gas dispersion layer can be applied from the slurry onto the gas distribution layer, the slurry can contain the catalyst particles in addition to the carbon particles and fluoropolymer binder. For additional details see, for example, the review by Valdrie Meille, Applied Catalysis A: General, 315, 2006, 1-17, the disclosure of which is incorporated herein by reference.

It will be understood by one skilled in the art that the crystalline and morphological structure of a catalyst described herein, including the presence, absence, or size of alloys, amorphous zones, crystalline zones of one or a variety of structural types, and the like, may be highly dependent upon process and manufacturing conditions, particularly when three or more elements are combined.

In some embodiments, the first layer of catalyst is deposited directly on to the nanostructured whiskers. In some embodiments, the first layer is at least one of covalently or ionically bonded to the nanostructured whiskers. In some embodiments, the first layer is adsorbed on to the nanostructured whiskers. The first layer can be formed, for example, as a uniform conformal coating or as dispersed discrete nanoparticles. Dispersed discrete tailored nanoparticles can be formed, for example, by a cluster beam deposition method by regulating the pressure of helium carrier gas or by self-organization. For additional details see, for example, Wan et al., Solid State Communications, 121, 2002, 251-256 or Bruno Chaudret, Top Organomet Chem, 2005, 16, 233-259, the disclosures of which is incorporated herein by reference.

In some embodiments, at least one of the following conditions holds:

(a) at least one of the layers comprising the oxygen evolution reaction catalyst has an elemental metal Pt to elemental metal oxygen evolution reaction catalyst ratio (i.e., the ratio of the number of Pt atoms to Ru atoms, if $RuO_2$ is the oxygen evolution reaction catalyst) of not greater than 1:1 (in some embodiments, not greater than 0.9:1, 0.8:1, 0.75:1, 0.7:1, 0.6:1, 0.5:1, 0.4:1, 0.3:1, 0.25:1, 0.2:1, or even not greater than 0.1:1, or even 0:1); or (b) at least one of the layers disposed on at least one of the first gas distribution layer, the second gas distribution layer, the optional first gas dispersion layer, or the optional second gas dispersion layer comprising the oxygen evolution reaction catalyst has an elemental metal Pt to elemental metal oxygen evolution reaction catalyst ratio of not greater than 1:1 (in some embodiments, not greater than 0.9:1, 0.8:1, 0.75:1, 0.7:1, 0.6:1, 0.5:1, 0.4:1, 0.3:1, 0.25:1, 0.2:1, or even not greater than 0.1:1, or even 0:1).

The membrane electrode assembly of the present disclosure has at least one of (i.e., any one, as well as any combination of the following, wherein it is understood that reference to the first and second gas dispersion layers is intended if either optional layer is present):

a layer comprising oxygen evolution reaction catalyst (e.g., at least a portion present) disposed on (e.g., attached to) the first major surface of the first gas distribution layer;

the first gas distribution layer comprising oxygen evolution reaction catalyst (e.g., at least a portion present, which includes distributed throughout the layer);

a layer comprising oxygen evolution reaction catalyst (e.g., at least a portion present, which includes distributed throughout the layer) disposed on (e.g., attached to) the second major surface of the first gas distribution layer;

a layer comprising oxygen evolution reaction catalyst (e.g., at least a portion present, which includes distributed throughout the layer) disposed between the first gas distribution layer and the first gas dispersion layer;

a layer comprising oxygen evolution reaction catalyst disposed (e.g., at least a portion present, which includes distributed throughout the layer) on (e.g., attached to) the first major surface of the first gas dispersion layer;

the first gas dispersion layer comprising oxygen evolution reaction catalyst (e.g., at least a portion present, which includes distributed throughout the layer);

a layer comprising oxygen evolution reaction catalyst disposed (e.g., at least a portion present, which includes distributed throughout the layer) on (e.g., attached to) the second major surface of the first gas dispersion layer;

a layer comprising oxygen evolution reaction catalyst disposed (e.g., at least a portion present, which includes distributed throughout the layer) on (e.g., attached to) the first major surface of the second gas dispersion layer;

the second gas dispersion layer comprising oxygen evolution reaction catalyst (e.g., at least a portion present, which includes distributed throughout the layer);

a layer comprising oxygen evolution reaction catalyst disposed (e.g., at least a portion present, which includes distributed throughout the layer) on (e.g., attached to) the second major surface of the second gas dispersion layer;

a layer comprising oxygen evolution reaction catalyst (e.g., at least a portion present, which includes distributed throughout the layer) disposed between the second gas distribution layer and the second gas dispersion layer;

a layer comprising oxygen evolution reaction catalyst disposed (e.g., at least a portion present, which includes distributed throughout the layer) on (e.g., attached to) the first major surface of the second gas distribution layer;

the second gas distribution layer comprising oxygen evolution reaction catalyst (e.g., at least a portion present, which includes distributed throughout the layer); and a layer comprising oxygen evolution reaction catalyst disposed (e.g., at least a portion present which includes distributed throughout the layer) on (e.g., attached to) the second major surface of the second gas distribution layer, wherein the portion present is an amount of at least 0.5 microgram/cm$^2$, in some embodiments, 1 microgram/cm$^2$, 1.5 microgram/cm$^2$, 2 micrograms/cm$^2$, 2.5 micrograms/cm$^2$, 3 micrograms/cm$^2$, or even at least 5 micrograms/cm$^2$; in some embodiments, in a range from 0.5 microgram/cm$^2$ to 100 micrograms/cm$^2$, 0.5 microgram/cm$^2$ to 75 micrograms/cm$^2$, 0.5 microgram/cm$^2$ to 50 micrograms/cm$^2$, 0.5 microgram/cm$^2$ to 25 micrograms/cm$^2$, 1 microgram/cm$^2$ to 100 micrograms/cm$^2$, 1 microgram/cm$^2$ to 75 micrograms/cm$^2$, 1 microgram/cm$^2$ to 50 micrograms/cm$^2$, 1 microgram/cm$^2$ to 25 micrograms/cm$^2$, 2 micrograms/cm$^2$ to 100 micrograms/cm$^2$, 2 micrograms/cm$^2$ to 75 micrograms/cm$^2$, 2 micrograms/cm$^2$ to 50 micrograms/cm$^2$, 2 micrograms/cm$^2$ to 30 micrograms/cm$^2$, 2 micrograms/cm$^2$ to 25 micrograms/cm$^2$, or even 2 micrograms/cm$^2$ to 20 micrograms/cm$^2$, based on the elemental metal content of the oxygen evolution reaction catalyst.

In some embodiments, at least the first and/or second gas distribution layer, if present, is essentially free of Pt (i.e., less than 0.1 microgram/cm$^2$ Pt).

It has been found, unexpectedly, that by physically, generally separating the oxygen evolution reaction (OER) catalyst (e.g., Ru, Ir, RuIr, or their oxides) from the Pt-based hydrogen oxidation reaction (HOR) catalyst on the anode side or the Pt-based oxygen reduction reaction (ORR) catalyst on the cathode side of a hydrogen PEM fuel cell, a substantial improvement in catalyst durability for gas switching events such as startup/shutdown or cell reversal (due to local fuel starvation) can be achieved. A further advantage of membrane electrode assemblies (MEAs) described herein is that the oxygen evolution reaction catalyst can be varied independently of the choice of anode and cathode catalyst layers applied to the polymer electrolyte membrane. Thus, the OER catalyst can be used with catalyst coated membranes having a variety of HOR and ORR catalyst layers, such as Pt supported on carbon or Pt on nanostructured thin film supports. The OER catalyst loading, processing, and performance-enhancing additives can be adjusted to meet the specific customer's needs for their particular anode, cathode, hold requirements, etc. This approach also permits a variety of catalyst coated membrane (CCM) and MEA constructions in which OER catalyst on or in the gas distribution layer or gas dispersion layer is one component, in addition to which another layer of catalyst is added.

Membrane electrode assemblies described herein are useful, for example, in electrochemical devices (e.g., is a fuel cell).

Figure 2:
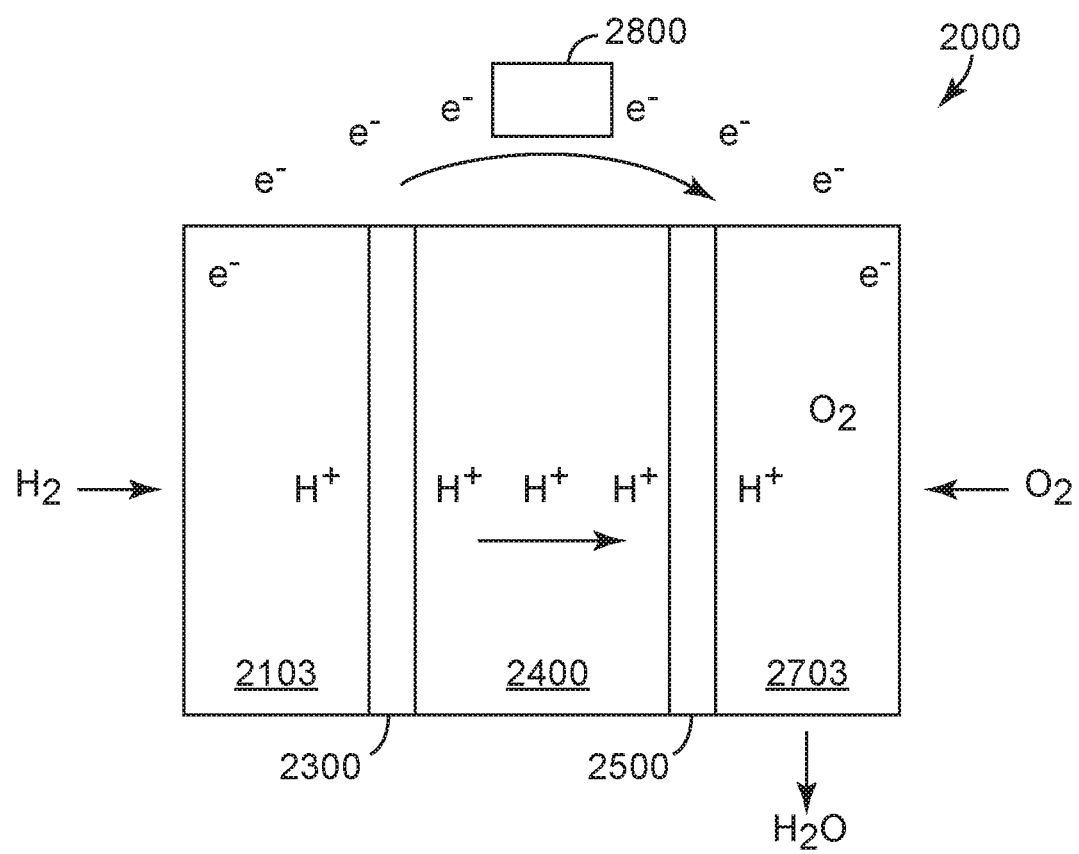
FIG. 2 is a schematic of an exemplary embodiment of a fuel cell having a membrane electrode assembly described herein.

Referring to FIG. 2, fuel cell 2000 includes first gas diffusion layer (GDL) 2103 adjacent anode catalyst layer 2300. First GDL 2103 comprises at least first gas distribution layer 100 of FIG. 1, and optionally further comprises at least one of elements 101, 102, 200, 201, 202, 1100, 1150, 1200, 1250, or 1300 of FIG. 1. Also adjacent anode catalyst layer 2300, on the opposite side from GDL 2103, is electrolyte membrane 2400. Cathode catalyst layer 2500 is adjacent electrolyte membrane 2400, and second gas diffusion layer 2703 is adjacent the cathode catalyst layer 2500. Second GDL 2703 comprises at least second gas distribution layer 700 of FIG. 1, and optionally further comprises at least one of elements 600, 601, 602, 701, 702, 1400, 1500, 1550, 1600, or 1700 of FIG. 1. GDLs 2103 and 2703 can be referred to as diffuse current collectors (DCCs) or fluid transport layers (FTLs). In operation, hydrogen fuel is introduced into the anode portion of fuel cell 2000, passing through first gas diffusion layer 2103 and over anode catalyst layer 2300. At anode catalyst layer 2300, the hydrogen fuel is separated into hydrogen ions (H$^+$) and electrons (e$^-$).

Electrolyte membrane 2400 permits only the hydrogen ions or protons to pass through electrolyte membrane 2400 to the cathode portion of fuel cell 2000. The electrons cannot pass through electrolyte membrane 2400 and, instead, flow through an external electrical circuit in the form of electric current. This current can power, for example, electric load 2800, such as an electric motor, or be directed to an energy storage device, such as a rechargeable battery.

Oxygen flows into the cathode side of fuel cell 2000 via second gas diffusion layer 2703. As the oxygen passes over cathode catalyst layer 2500, oxygen, protons, and electrons combine to produce water and heat. In some embodiments, the fuel cell catalyst in the anode catalyst layer, the cathode catalyst layer, or both, comprises no electrically conductive carbon-based material (i.e., the catalyst layer may comprise, for example, perylene red, fluoropolymers, or polyolefins).

EXEMPLARY EMBODIMENTS

1. A membrane electrode assembly comprising, in order:
   a first gas distribution layer (e.g., a first gas diffusion layer);
   optionally a first gas dispersion layer (e.g., a first microporous layer);
   an anode catalyst layer comprising a first catalyst;
   a membrane;
   a cathode catalyst layer comprising a second catalyst;
   optionally a second gas dispersion layer (e.g., a second microporous layer); and
   a second gas distribution layer (e.g., a second gas diffusion layer),
   wherein the first gas distribution layer has first and second generally opposed major surfaces;
   wherein the anode catalyst layer has first and second generally opposed major surfaces, wherein the second major surface of the first gas distribution layer is closer to the first major surface of the anode catalyst layer than to the second major surface of the first anode catalyst layer;
   wherein the membrane has first and second generally opposed major surfaces, wherein the second major surface of the anode catalyst layer is closer to the first major surface of the membrane than to the second major surface of the membrane;
   wherein the cathode catalyst layer has first and second generally opposed major surfaces, wherein the second major surface of the membrane is closer to the first major surface of the cathode catalyst layer than to the second major surface of the cathode catalyst layer; and
   wherein the second gas distribution layer has first and second generally opposed major surfaces, wherein the second major surface of the cathode catalyst layer is closer to the first major surface of the second gas distribution layer than to the second major surface of the second gas distribution layer,
   wherein there is at least one of (i.e., any one, as well as any combination of the following, wherein it is understood that reference to the first and second gas dispersion layers is intended if either optional layer is present):
   a layer comprising oxygen evolution reaction catalyst (e.g., at least a portion present in an amount of at least 0.5 microgram/cm$^2$, in some embodiments, 1 microgram/cm$^2$, 1.5 microgram/cm$^2$, 2 micrograms/cm$^2$, 2.5 micrograms/cm$^2$, 3 micrograms/cm$^2$, or even at least 5 micrograms/cm$^2$; in some embodiments, in a range from 0.5 microgram/cm$^2$ to 100 micrograms/cm$^2$, 0.5 microgram/cm$^2$ to 75 micrograms/cm$^2$, 0.5 microgram/cm$^2$ to 50 micrograms/cm$^2$, 0.5 microgram/cm$^2$ to 25 micrograms/cm$^2$, 1 microgram/cm$^2$ to 100 micrograms/cm$^2$, 1 microgram/cm$^2$ to 75 micrograms/cm$^2$, 1 microgram/cm$^2$ to 50 micrograms/cm$^2$, 1 microgram/cm$^2$ to 25 micrograms/cm$^2$, 2 micrograms/cm$^2$ to 100 micrograms/cm$^2$, 2 micrograms/cm$^2$ to 75 micrograms/cm$^2$, 2 micrograms/cm$^2$ to 50 micrograms/cm$^2$, 2 micrograms/cm$^2$ to 30 micrograms/cm$^2$, 2 micrograms/cm$^2$ to 25 micrograms/cm$^2$, or even 2 micrograms/cm$^2$ to 20 micrograms/cm$^2$, based on the elemental metal content of the oxygen evolution reaction catalyst) disposed on (e.g., attached to) the first major surface of the first gas distribution layer;
   the first gas distribution layer comprising oxygen evolution reaction catalyst (e.g., at least a portion present in an amount of at least 0.5 microgram/cm$^2$, in some embodiments, 1 microgram/cm$^2$, 1.5 microgram/cm$^2$, 2 micrograms/cm$^2$, 2.5 micrograms/cm$^2$, 3 micrograms/cm$^2$, or even at least 5 micrograms/cm$^2$; in some embodiments, in a range from 0.5 microgram/cm$^2$ to 100 micrograms/cm$^2$, 0.5 microgram/cm$^2$ to 75 micrograms/cm$^2$, 0.5 microgram/cm$^2$ to 50 micrograms/cm$^2$, 0.5 microgram/cm$^2$ to 25 micrograms/cm$^2$, 1 microgram/cm$^2$ to 100 micrograms/cm$^2$, 1 microgram/cm$^2$ to 75 micrograms/cm$^2$, 1 microgram/cm$^2$ to 50 micrograms/cm$^2$, 1 microgram/cm$^2$ to 25 micrograms/cm$^2$, 2 micrograms/cm$^2$ to 100 micrograms/cm$^2$, 2 micrograms/cm$^2$ to 75 micrograms/cm$^2$, 2 micrograms/cm$^2$ to 50 micrograms/cm$^2$, 2 micrograms/cm$^2$ to 30 micrograms/cm$^2$, 2 micrograms/cm$^2$ to 25 micrograms/cm$^2$, or even 2 micrograms/cm$^2$ to 20 micrograms/cm$^2$, based on the elemental metal content of the oxygen evolution reaction catalyst);
   a layer comprising oxygen evolution reaction catalyst (e.g., at least a portion present in an amount of at least 0.5 microgram/cm$^2$, in some embodiments, 1 microgram/cm$^2$, 1.5 microgram/cm$^2$, 2 micrograms/cm$^2$, 2.5 micrograms/cm$^2$, 3 micrograms/cm$^2$, or even at least 5 micrograms/cm$^2$; in some embodiments, in a range from 0.5 microgram/cm$^2$ to 100 micrograms/cm$^2$, 0.5 microgram/cm$^2$ to 75 micrograms/cm$^2$, 0.5 microgram/cm$^2$ to 50 micrograms/cm$^2$, 0.5 microgram/cm$^2$ to 25 micrograms/cm$^2$, 1 microgram/cm$^2$ to 100 micrograms/cm$^2$, 1 microgram/cm$^2$ to 75 micrograms/cm$^2$, 1 microgram/cm$^2$ to 50 micrograms/cm$^2$, 1 microgram/cm$^2$ to 25 micrograms/cm$^2$, 2 micrograms/cm$^2$ to 100 micrograms/cm$^2$, 2 micrograms/cm$^2$ to 75 micrograms/cm$^2$, 2 micrograms/cm$^2$ to 50 micrograms/cm$^2$, 2 micrograms/cm$^2$ to 30 micrograms/cm$^2$, 2 micrograms/cm$^2$ to 25 micrograms/cm$^2$, or even 2 micrograms/cm$^2$ to 20 micrograms/cm$^2$, based on the elemental metal content of the oxygen evolution reaction catalyst) disposed on (e.g., attached to) the second major surface of the first gas distribution layer;
   a layer comprising oxygen evolution reaction catalyst (e.g., at least a portion present in an amount of at least 0.5 microgram/cm$^2$, in some embodiments, 1 microgram/cm$^2$, 1.5 microgram/cm$^2$, 2 micrograms/cm$^2$, 2.5 micrograms/cm$^2$, 3 micrograms/cm$^2$, or even at least 5 micrograms/cm$^2$; in some embodiments, in a range from 0.5 microgram/cm$^2$ to 100 micrograms/cm$^2$, 0.5 microgram/cm$^2$ to 75 micrograms/cm$^2$, 0.5 microgram/cm$^2$ to 50 micrograms/cm$^2$, 0.5 microgram/cm$^2$ to 25 micrograms/cm$^2$, 1 microgram/cm$^2$ to 100 micrograms/cm$^2$, 1 microgram/cm$^2$ to 75 micrograms/cm$^2$, 1 microgram/cm$^2$ to 50 micrograms/cm$^2$, 1 microgram/cm$^2$ to 25 micrograms/cm$^2$, 2 micrograms/cm$^2$ to 100 micrograms/cm$^2$, 2 micrograms/cm$^2$ to 75 micrograms/cm$^2$, 2 micrograms/cm$^2$ to 50 micrograms/cm$^2$, 2 micrograms/cm$^2$ to 30 micrograms/cm$^2$, 2 micrograms/cm$^2$ to 25 micrograms/cm$^2$, or even 2 micrograms/cm$^2$ to 20 micrograms/cm$^2$, based on the elemental metal content of the oxygen evolution reaction catalyst) disposed between the first gas distribution layer and the first gas dispersion layer;
   a layer comprising oxygen evolution reaction catalyst disposed (e.g., at least a portion present in an amount of at least 0.5 microgram/cm$^2$, in some embodiments, 1 microgram/cm$^2$, 1.5 microgram/cm$^2$, 2 micrograms/cm$^2$, 2.5 micrograms/cm$^2$, 3 micrograms/cm$^2$, or even at least 5 micrograms/cm², in some embodiments, in a range from 0.5 microgram/cm² to 100 micrograms/cm², 0.5 microgram/cm² to 75 micrograms/cm², 0.5 microgram/cm² to 50 micrograms/cm², 0.5 microgram/cm² to 25 micrograms/cm², 1 microgram/cm² to 100 micrograms/cm², 1 microgram/cm² to 75 micrograms/cm², 1 microgram/cm² to 50 micrograms/cm², 1 microgram/cm² to 25 micrograms/cm², 2 micrograms/cm² to 100 micrograms/cm², 2 micrograms/cm² to 75 micrograms/cm², 2 micrograms/cm² to 50 micrograms/cm², 2 micrograms/cm² to 30 micrograms/cm², 2 micrograms/cm² to 25 micrograms/cm², or even 2 micrograms/cm² to 20 micrograms/cm², based on the elemental metal content of the oxygen evolution reaction catalyst) on (e.g., attached to) the first major surface of the first gas dispersion layer;

the first gas dispersion layer comprising oxygen evolution reaction catalyst (e.g., at least a portion present in an amount of at least 0.5 microgram/cm², in some embodiments, 1 microgram/cm², 1.5 microgram/cm², 2 micrograms/cm², 2.5 micrograms/cm², 3 micrograms/cm², or even at least 5 micrograms/cm²; in some embodiments, in a range from 0.5 microgram/cm² to 100 micrograms/cm², 0.5 microgram/cm² to 75 micrograms/cm², 0.5 microgram/cm² to 50 micrograms/cm², 0.5 microgram/cm² to 25 micrograms/cm², 1 microgram/cm² to 100 micrograms/cm², 1 microgram/cm² to 75 micrograms/cm², 1 microgram/cm² to 50 micrograms/cm², 1 microgram/cm² to 25 micrograms/cm², 2 micrograms/cm² to 100 micrograms/cm², 2 micrograms/cm² to 75 micrograms/cm², 2 micrograms/cm² to 50 micrograms/cm², 2 micrograms/cm² to 30 micrograms/cm², 2 micrograms/cm² to 25 micrograms/cm², or even 2 micrograms/cm² to 20 micrograms/cm², based on the elemental metal content of the oxygen evolution reaction catalyst);

a layer comprising oxygen evolution reaction catalyst disposed (e.g., at least a portion present in an amount of at least 0.5 microgram/cm², in some embodiments, 1 microgram/cm², 1.5 microgram/cm², 2 micrograms/cm², 2.5 micrograms/cm², 3 micrograms/cm², or even at least 5 micrograms/cm²; in some embodiments, in a range from 0.5 microgram/cm² to 100 micrograms/cm², 0.5 microgram/cm² to 75 micrograms/cm², 0.5 microgram/cm² to 50 micrograms/cm², 0.5 microgram/cm² to 25 micrograms/cm², 1 microgram/cm² to 100 micrograms/cm², 1 microgram/cm² to 75 micrograms/cm², 1 microgram/cm² to 50 micrograms/cm², 1 microgram/cm² to 25 micrograms/cm², 2 micrograms/cm² to 100 micrograms/cm², 2 micrograms/cm² to 75 micrograms/cm², 2 micrograms/cm² to 50 micrograms/cm², 2 micrograms/cm² to 30 micrograms/cm², 2 micrograms/cm² to 25 micrograms/cm², or even 2 micrograms/cm² to 20 micrograms/cm², based on the elemental metal content of the oxygen evolution reaction catalyst) on (e.g., attached to) the second major surface of the first gas dispersion layer;

a layer comprising oxygen evolution reaction catalyst disposed (e.g., at least a portion present in an amount of at least 0.5 microgram/cm², in some embodiments, 1 microgram/cm², 1.5 microgram/cm², 2 micrograms/cm², 2.5 micrograms/cm², 3 micrograms/cm², or even at least 5 micrograms/cm²; in some embodiments, in a range from 0.5 microgram/cm² to 100 micrograms/cm², 0.5 microgram/cm² to 75 micrograms/cm², 0.5 microgram/cm² to 50 micrograms/cm², 0.5 microgram/cm² to 25 micrograms/cm², 1 microgram/cm² to 100 micrograms/cm², 1 microgram/cm² to 75 micrograms/cm², 1 microgram/cm² to 50 micrograms/cm², 1 microgram/cm² to 25 micrograms/cm², 2 micrograms/cm² to 100 micrograms/cm², 2 micrograms/cm² to 75 micrograms/cm², 2 micrograms/cm² to 50 micrograms/cm², 2 micrograms/cm² to 30 micrograms/cm², 2 micrograms/cm² to 25 micrograms/cm², or even 2 micrograms/cm² to 20 micrograms/cm², based on the elemental metal content of the oxygen evolution reaction catalyst) on (e.g., attached to) the first major surface of the second gas dispersion layer;

the second gas dispersion layer comprising oxygen evolution reaction catalyst (e.g., at least a portion present in an amount of at least 0.5 microgram/cm², in some embodiments, 1 microgram/cm², 1.5 microgram/cm², 2 micrograms/cm², 2.5 micrograms/cm², 3 micrograms/cm², or even at least 5 micrograms/cm²; in some embodiments, in a range from 0.5 microgram/cm² to 100 micrograms/cm², 0.5 microgram/cm² to 75 micrograms/cm², 0.5 microgram/cm² to 50 micrograms/cm², 0.5 microgram/cm² to 25 micrograms/cm², 1 microgram/cm² to 100 micrograms/cm², 1 microgram/cm² to 75 micrograms/cm², 1 microgram/cm² to 50 micrograms/cm², 1 microgram/cm² to 25 micrograms/cm², 2 micrograms/cm² to 100 micrograms/cm², 2 micrograms/cm² to 75 micrograms/cm², 2 micrograms/cm² to 50 micrograms/cm², 2 micrograms/cm² to 30 micrograms/cm², 2 micrograms/cm² to 25 micrograms/cm², or even 2 micrograms/cm² to 20 micrograms/cm², based on the elemental metal content of the oxygen evolution reaction catalyst);

a layer comprising oxygen evolution reaction catalyst disposed (e.g., at least a portion present in an amount of at least 0.5 microgram/cm², in some embodiments, 1 microgram/cm², 1.5 microgram/cm², 2 micrograms/cm², 2.5 micrograms/cm², 3 micrograms/cm², or even at least 5 micrograms/cm²; in some embodiments, in a range from 0.5 microgram/cm² to 100 micrograms/cm², 0.5 microgram/cm² to 75 micrograms/cm², 0.5 microgram/cm² to 50 micrograms/cm², 0.5 microgram/cm² to 25 micrograms/cm², 1 microgram/cm² to 100 micrograms/cm², 1 microgram/cm² to 75 micrograms/cm², 1 microgram/cm² to 50 micrograms/cm², 1 microgram/cm² to 25 micrograms/cm², 2 micrograms/cm² to 100 micrograms/cm², 2 micrograms/cm² to 75 micrograms/cm², 2 micrograms/cm² to 50 micrograms/cm², 2 micrograms/cm² to 30 micrograms/cm², 2 micrograms/cm² to 25 micrograms/cm², or even 2 micrograms/cm² to 20 micrograms/cm², based on the elemental metal content of the oxygen evolution reaction catalyst) on (e.g., attached to) the second major surface of the second gas dispersion layer;

a layer comprising oxygen evolution reaction catalyst (e.g., at least a portion present in an amount of at least 0.5 microgram/cm², in some embodiments, 1 microgram/cm², 1.5 microgram/cm², 2 micrograms/cm², 2.5 micrograms/cm², 3 micrograms/cm², or even at least 5 micrograms/cm²; in some embodiments, in a range from 0.5 microgram/cm² to 100 micrograms/cm², 0.5 microgram/cm² to 75 micrograms/cm², 0.5 microgram/cm² to 50 micrograms/cm², 0.5 microgram/cm² to 25 micrograms/cm², 1 microgram/cm² to 100 micrograms/cm², 1 microgram/cm² to 75 micrograms/cm², 1 microgram/cm² to 50 micrograms/cm², 1 microgram/cm² to 25 micrograms/cm², 2 micrograms/cm² to 100 micrograms/cm², 2 micrograms/cm² to 75 micrograms/cm², 2 micrograms/cm² to 50 micrograms/cm², 2 micrograms/cm² to 30 micrograms/cm², 2 micrograms/cm² to 25 micrograms/cm², or even 2 micrograms/cm² to 20 micrograms/cm², based on the elemental metal content of the oxygen evolution reaction catalyst) disposed between the second gas distribution layer and the second gas dispersion layer;

a layer comprising oxygen evolution reaction catalyst disposed (e.g., at least a portion present in an amount of at least 0.5 microgram/cm², in some embodiments, 1 microgram/cm², 1.5 microgram/cm², 2 micrograms/cm², 2.5 micrograms/cm², 3 micrograms/cm², or even at least 5 micrograms/cm²; in some embodiments, in a range from 0.5 microgram/cm² to 100 micrograms/cm², 0.5 microgram/cm² to 75 micrograms/cm², 0.5 microgram/cm² to 50 micrograms/cm², 0.5 microgram/cm² to 25 micrograms/cm², 1 microgram/cm² to 100 micrograms/cm², 1 microgram/cm² to 75 micrograms/cm², 1 microgram/cm² to 50 micrograms/cm², 1 microgram/cm² to 25 micrograms/cm², 2 micrograms/cm² to 100 micrograms/cm², 2 micrograms/cm² to 75 micrograms/cm², 2 micrograms/cm² to 50 micrograms/cm², 2 micrograms/cm² to 30 micrograms/cm², 2 micrograms/cm² to 25 micrograms/cm², or even 2 micrograms/cm² to 20 micrograms/cm², based on the elemental metal content of the oxygen evolution reaction catalyst) on (e.g., attached to) the first major surface of the second gas distribution layer;

the second gas distribution layer comprising oxygen evolution reaction catalyst (e.g., at least a portion present in an amount of at least 0.5 microgram/cm², in some embodiments, 1 microgram/cm², 1.5 microgram/cm², 2 micrograms/cm², 2.5 micrograms/cm², 3 micrograms/cm², or even at least 5 micrograms/cm²; in some embodiments, in a range from 0.5 microgram/cm² to 100 micrograms/cm², 0.5 microgram/cm² to 75 micrograms/cm², 0.5 microgram/cm² to 50 micrograms/cm², 0.5 microgram/cm² to 25 micrograms/cm², 1 microgram/cm² to 100 micrograms/cm², 1 microgram/cm² to 75 micrograms/cm², 1 microgram/cm² to 50 micrograms/cm², 1 microgram/cm² to 25 micrograms/cm², 2 micrograms/cm² to 100 micrograms/cm², 2 micrograms/cm² to 75 micrograms/cm², 2 micrograms/cm² to 50 micrograms/cm², 2 micrograms/cm² to 30 micrograms/cm², 2 micrograms/cm² to 25 micrograms/cm², or even 2 micrograms/cm² to 20 micrograms/cm², based on the elemental metal content of the oxygen evolution reaction catalyst); and a layer comprising oxygen evolution reaction catalyst disposed (e.g., at least a portion present in an amount of at least 0.5 microgram/cm², in some embodiments, 1 microgram/cm², 1.5 microgram/cm², 2 micrograms/cm², 2.5 micrograms/cm², 3 micrograms/cm², or even at least 5 micrograms/cm²; in some embodiments, in a range from 0.5 microgram/cm² to 100 micrograms/cm², 0.5 microgram/cm² to 75 micrograms/cm², 0.5 microgram/cm² to 50 micrograms/cm², 0.5 microgram/cm² to 25 micrograms/cm², 1 microgram/cm² to 100 micrograms/cm², 1 microgram/cm² to 75 micrograms/cm², 1 microgram/cm² to 50 micrograms/cm², 1 microgram/cm² to 25 micrograms/cm², 2 micrograms/cm² to 100 micrograms/cm², 2 micrograms/cm² to 75 micrograms/cm², 2 micrograms/cm² to 50 micrograms/cm², 2 micrograms/cm² to 30 micrograms/cm², 2 micrograms/cm² to 25 micrograms/cm², or even 2 micrograms/cm² to 20 micrograms/cm², based on the elemental metal content of the oxygen evolution reaction catalyst) on (e.g., attached to) the second major surface of the second gas distribution layer.

2. The membrane electrode assembly of Exemplary Embodiment 1, wherein the anode catalyst layer comprises at least one of:

(a) at least one of elemental Au, Co, Fe, Ir, Mn, Ni, Os, Pd, Pt, Rh, or Ru;

(b) at least one alloy comprising at least one of Au, Co, Fe, Ir, Mn, Ni, Os, Pd, Pt, Rh, or Ru;

(c) at least one composite comprising at least one of Au, Co, Fe, Ir, Mn, Ni, Os, Pd, Pt, Rh, or Ru;

(d) at least one oxide, hydrated oxide, or hydroxide of at least one of Au, Co, Fe, Ir, Mn, Ni, Os, Pd, Pt, Rh, or Ru;

(e) at least one organometallic complex of at least one of Au, Co, Fe, Ir, Mn, Ni, Os, Pd, Pt, Rh, or Ru;

(f) at least one carbide of at least one of Au, Co, Fe, Ir, Mn, Ni, Os, Pd, Pt, Rh, or Ru;

(g) at least one fluoride of at least one of Au, Co, Fe, Ir, Mn, Ni, Os, Pd, Pt, Rh, or Ru;

(h) at least one nitride of at least one of Au, Co, Fe, Ir, Mn, Ni, Os, Pd, Pt, Rh, or Ru;

(i) at least one boride of at least one of Au, Co, Fe, Ir, Mn, Ni, Os, Pd, Pt, Rh, or Ru;

(j) at least one oxycarbide of at least one of Au, Co, Fe, Ir, Mn, Ni, Os, Pd, Pt, Rh, or Ru;

(k) at least one oxyfluoride of at least one of Au, Co, Fe, Ir, Mn, Ni, Os, Pd, Pt, Rh, or Ru;

(l) at least one oxynitride of at least one of Au, Co, Fe, Ir, Mn, Ni, Os, Pd, Pt, Rh, or Ru; or (m) at least one oxyboride of at least one of Au, Co, Fe, Ir, Mn, Ni, Os, Pd, Pt, Rh, or Ru.

3. The membrane electrode assembly of any preceding Exemplary Embodiment, wherein the anode catalyst layer comprises at least one of:

(a') at least one of elemental Al, carbon, Hf, Nb, Re, Si, Sn, Ta, Ti, W, or Zr;

(b') at least one alloy comprising at least one of Al, carbon, Hf, Nb, Re, Si, Sn, Ta, Ti, W, or Zr;

(c') at least one composite comprising at least one of Al, carbon, Hf, Nb, Re, Si, Sn, Ta, Ti, W, or Zr;

(d') at least one oxide of at least one of Al, Hf, Nb, Re, Si, Sn, Ta, Ti, W, or Zr;

(e') at least one organometallic complex of at least one of Al, Hf, Nb, Re, Si, Sn, Ta, Ti, W, or Zr;

(f') at least one carbide of at least one of Al, Hf, Nb, Re, Si, Sn, Ta, Ti, W, or Zr;

(g') at least one fluoride of at least one of Al, carbon, Hf, Nb, Re, Si, Sn, Ta, Ti, W, or Zr;

(h') at least one nitride of at least one of Al, carbon, Hf, Nb, Re, Si, Sn, Ta, Ti, W, or Zr;

(i') at least one oxycarbide of at least one of Al, Hf, Nb, Re, Si, Sn, Ta, Ti, W, or Zr;

(j') at least one oxyfluoride of at least one of Al, Hf, Nb, Re, Si, Sn, Ta, Ti, W, or Zr;

(k') at least one oxynitride of at least one of Al, carbon, Hf, Nb, Re, Si, Sn, Ta, Ti, W, or Zr;

(l') at least one boride of at least one of Al, carbon, Hf, Nb, Re, Si, Sn, Ta, Ti, W, or Zr; or (m') at least one oxyboride of at least one of Al, Hf, Nb, Re, Si, Sn, Ta, Ti, W, or Zr.

4. The membrane electrode assembly of any preceding Exemplary Embodiment, wherein the anode catalyst layer comprises nanostructured whiskers with the catalyst thereon.

5. The membrane electrode assembly of any preceding Exemplary Embodiment, wherein the cathode catalyst layer comprises at least one of:

(a") at least one of elemental Au, Co, Fe, Ir, Mn, Ni, Os, Pd, Pt, Rh, or Ru;

(b") at least one alloy comprising at least one of Au, Co, Fe, Ir, Mn, Ni, Os, Pd, Pt, Rh, or Ru;

(c") at least one composite comprising at least one of Au, Co, Fe, Ir, Mn, Ni, Os, Pd, Pt, Rh, or Ru;

(d") at least one oxide of at least one of Au, Co, Fe, Ir, Mn, Ni, Os, Pd, Pt, Rh, or Ru;

(e") at least one organometallic complex of at least one of Au, Co, Fe, Ir, Mn, Ni, Os, Pd, Pt, Rh, or Ru;

(f") at least one carbide of at least one of Au, Co, Fe, Ir, Mn, Ni, Os, Pd, Pt, Rh, or Ru;

(g") at least one fluoride of at least one of Au, Co, Fe, Ir, Mn, Ni, Os, Pd, Pt, Rh, or Ru;

(h") at least one nitride of at least one of Au, Co, Fe, Ir, Mn, Ni, Os, Pd, Pt, Rh, or Ru;

(i") at least one boride of at least one of Au, Co, Fe, Ir, Mn, Ni, Os, Pd, Pt, Rh, or Ru;

(j") at least one oxycarbide of at least one of Au, Co, Fe, Ir, Mn, Ni, Os, Pd, Pt, Rh, or Ru;

(k") at least one oxyfluoride of at least one of Au, Co, Fe, Ir, Mn, Ni, Os, Pd, Pt, Rh, or Ru;

(l") at least one oxynitride of at least one of Au, Co, Fe, Ir, Mn, Ni, Os, Pd, Pt, Rh, or Ru; or (m") at least one oxyboride of at least one of Au, Co, Fe, Ir, Mn, Ni, Os, Pd, Pt, Rh, or Ru.

6. The membrane electrode assembly of any preceding Exemplary Embodiment, wherein the cathode catalyst layer comprises at least one of:

(a''') at least one of elemental Al, carbon, Hf, Nb, Re, Si, Sn, Ta, Ti, W, or Zr;

(b''') at least one alloy comprising at least one of Al, carbon, Hf, Nb, Re, Si, Sn, Ta, Ti, W, or Zr;

(c''') at least one composite comprising at least one of Al, carbon, Hf, Nb, Re, Si, Sn, Ta, Ti, W, or Zr;

(d''') at least one oxide of at least one of Al, Hf, Nb, Re, Si, Sn, Ta, Ti, W, or Zr;

(e''') at least one organometallic complex of at least one of Al, Hf, Nb, Re, Si, Sn, Ta, Ti, W, or Zr;

(f''') at least one carbide of at least one of Al, Hf, Nb, Re, Si, Sn, Ta, Ti, W, or Zr;

(g''') at least one fluoride of at least one of Al, carbon, Hf, Nb, Re, Si, Sn, Ta, Ti, W, or Zr;

(h''') at least one nitride of at least one of Al, carbon, Hf, Nb, Re, Si, Sn, Ta, Ti, W, or Zr;

(i''') at least one oxycarbide of at least one of Al, Hf, Nb, Re, Si, Sn, Ta, Ti, W, or Zr;

(j''') at least one oxyfluoride of at least one of Al, Hf, Nb, Re, Si, Sn, Ta, Ti, W, or Zr;

(k''') at least one oxynitride of at least one of Al, carbon, Hf, Nb, Re, Si, Sn, Ta, Ti, W, or Zr;

(l''') at least one boride of at least one of Al, carbon, Hf, Nb, Re, Si, Sn, Ta, Ti, W, or Zr; or (m''') at least one oxyboride of at least one of Al, Hf, Nb, Re, Si, Sn, Ta, Ti, W, or Zr.

7. The membrane electrode assembly of any preceding Exemplary Embodiment, wherein the cathode catalyst layer comprises nanostructured whiskers with the catalyst thereon.

8. The membrane electrode assembly of any preceding Exemplary Embodiment, wherein the membrane electrode assembly meets at least one of the following conditions:

(a) at least one of the layers comprising the oxygen evolution reaction catalyst has an elemental metal Pt to elemental metal oxygen evolution reaction catalyst ratio (i.e., the ratio of the number of Pt atoms to Ru atoms, if $RuO_2$ is the oxygen evolution reaction catalyst) of not greater than 1:1 (in some embodiments, not greater than 0.9:1, 0.8:1, 0.75:1, 0.7:1, 0.6:1, 0.5:1, 0.4:1, 0.3:1, 0.25:1, 0.2:1, or even not greater than 0.1:1, or even 0:1); or (b) at least one of the layers disposed on at least one of the first gas distribution layer, the second gas distribution layer, the optional first gas dispersion layer, or the optional second gas dispersion layer comprising the oxygen evolution reaction catalyst has an elemental metal Pt to elemental metal oxygen evolution reaction catalyst ratio of not greater than 1:1 (in some embodiments, not greater than 0.9:1, 0.8:1, 0.75:1, 0.7:1, 0.6:1, 0.5:1, 0.4:1, 0.3:1, 0.25:1, 0.2:1, or even not greater than 0.1:1, or even 0:1).

9. The membrane electrode assembly of any preceding Exemplary Embodiment, wherein the first gas dispersion layer has first and second generally opposed major surfaces, wherein the second major surface of the first gas distribution layer is closer to the first major surface of the first gas dispersion layer than to the second major surface of the first gas dispersion layer.

10. The membrane electrode assembly of Exemplary Embodiment 9, wherein the first gas distribution layer is essentially free of Pt (i.e., less than 0.1 microgram/cm$^2$ Pt).

11. The membrane electrode assembly of any preceding Exemplary Embodiment, wherein the second gas dispersion layer has first and second generally opposed major surfaces, wherein the second major surface of the cathode catalyst layer is closer to the first major surface of the second gas dispersion layer than to the second major surface of the second gas dispersion layer.

12. The membrane electrode assembly of Exemplary Embodiment 11, wherein the second gas distribution layer is essentially free of Pt (i.e., less than 0.1 microgram/cm$^2$).

13. An electrochemical device comprising at least one of a membrane electrode assembly of any preceding Exemplary Embodiment.

14. The electrochemical device of Exemplary Embodiment 13, which is a fuel cell.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Membrane Electrode Assembly (MEA) Preparation

All the MEA's for the Examples and Comparative Examples were made with the same perfluorinated sulfonic acid membrane (available as "825EW ionomer" from 3M Company, St. Paul, Minn.) with a nominal equivalent weight of 825. The membranes had a thickness of about 24 micrometers. The cathode catalyst layers were prepared from dispersed Pt catalyst (at a loading of 400 microgram/cm$^2$ loading) by using the decal process well known in the art; see, for example, Gottesfeld and Zawodzinski, Advances in Electrochemical Science and Engineering, Vol. 5., Weinheim: Wiley-VCH; 1997, or Wilson and Gottesfeld, J Appl. Electrochem., 1992, 22:1-7, the disclosure of which is incorporated herein by reference.

The gas diffusion layers (GDL) were fabricated by coating one side of a carbon paper electrode backing layer (obtained from Mitsubishi Rayon Corp., Tokyo, Japan) with a gas dispersion layer/microporous layer (MPL). The microporous layers were prepared using a coating/impregnation process as generally described in U.S. Pat. No. 6,465,041 (Frisk et al.), the disclosure of which is incorporated herein by reference. The impregnation process included the following steps: An alcohol suspension calculated for a final loading of 1.5 milligrams/cm$^2$ of carbon black powder (obtained under the trade designation "VULCAN XC-72" from Cabot Corporation, Boston, Mass.) and 10 percent by weight polytetrafluoroethylene emulsion (obtained under the trade designation "TEFLON" by E.I. du Pont de Nemours, Wilmington, Del.) was thoroughly stirred using ultrasonic equipment and then impregnated into the carbon paper to form the precursor for the microporous layer. The precursor microporous layer was first baked at 240° C. for about 30 minutes and then sintered at 350° C. for about 40 minutes to form the microporous layer.

The membrane electrode assemblies were fabricated using a laminator (obtained under the trade designation "CHEMINSTRUMENTS HL-101 DUAL HEAT ROLL LAMINATOR" from Cheminstruments Inc., West Chester, Ohio) at conditions of 177° C. (350° F.) under 1.0 MPa (150 psig), at a feed rate of 36.5 centimeters (1.2 feet) per minute using the following lamination method. In this method the laminator was fed with a stack of parts arranged in the following order: a sheet of paper (obtained under the trade designation "HAMMERMILL 122549" from International Paper, Memphis, Tenn.,) a PEM-coated polyimide release liner (obtained under the trade designation "KAPTON HN" from E.I. du Pont de Nemours) with the PEM on the side opposite the sheet of paper, a catalyst-coated polyimide release liner ("KAPTON HN") with the catalyst layer facing PEM, and second sheet of paper ("HAMMERMILL 122549"). The sample was then immediately peeled from both liners after lamination, leaving a half catalyst coated membrane (CCM). CCMs were stored between fluoropolymer sheets (obtained under the trade designation "TEFLON" from E.I. du Pont de Nemours) in plastic bags stored on flat surfaces, in order to keep debris from contaminating or puncturing the membranes. Prior to MEA construction, CCMs were cut down to 4 inch by 4 inch (10.16 cm by 10.16 cm) samples, with mounting holes added outside of the 50 cm$^2$ centered active area to assist in assembly.

The anode catalysts described in the Examples and Comparative Examples below were prepared using a similar 5 layer membrane electrode assembly construction having the following sequence of layers: gas diffusion layer, electrode, polymer electrolyte membrane (PEM), electrode, and gas diffusion layer. The microporous layers coated on the gas diffusion layers are located between the gas diffusion layers and electrodes, resulting in a 7 layer construct. As for Comparative Example C, the anode electrode had two layers, a nanostructured thin film oxygen evolution reaction catalyst layer and a dispersed Pt on carbon layer.

MEA Evaluation Method

The Examples and Comparative Examples described below were installed in 50 cm$^2$ cells, having quad-serpentine flow fields, at about 10% compression, and operated under a scripted protocol for break in and fuel cell performance testing. The test stations were obtained from Fuel Cell Technology, Albuquerque, N. Mex. For this test method, the oxygen evolution reaction catalyst was operated as the cathode during conditioning, and a series of about 14 thermal cycles (thermal cycle details can be found in 2010 DOE Hydrogen Program Review, Advance Cathode Catalysts and Supports for PEM Fuel Cells, Debe, Jun. 8, 2010 (see http://www.hydrogen.energy.gov/pdfs/review10/fc001_debe_2010_o_web.pdf, the disclosure of which is incorporated herein by reference (last viewed Dec. 1, 2014 at 9:37 am (CST))) were performed to break in the OER catalyst and the MEA's. However, during actual cell operation, including gas switch/load cycle testing, the OER catalyst was operated as the anode. The cell had set points of 75° C. cell temperature, an anode flow of 800 sccm hydrogen at an inlet dew point of 68° C., cathode flow of 1800 sccm air at an inlet dew point of 68° C., with outlets being at ambient pressure. During the thermal cycle the MEA under test was exercised by conducting three potentiodynamic scans between 0.9-0.3 volts. The "thermal cycles" were found helpful to sweep away impurities and bring up the performance of the thin film electrodes quickly.

Then the OER effectiveness durability of the anode catalysts was evaluated. The OER effectiveness durability was expressed as the time the OER catalyst was capable of holding the voltage below a predetermined level at a given current. The OER effectiveness durability was evaluated under nitrogen which was humidified to full saturation at 70° C.

Gas switching was achieved by alternating the reactant on the anode (OER catalyst) from hydrogen to air (wherein oxygen was the reactant) by using two different dedicated mass flow controllers, while all other test station parameters were held fixed: the cell temperature 68° C., cathode air flow 1800 sccm air, inlet RH 70%, and outlet pressure 138 kPa gauge. This was in contrast to normal fuel cell use where the anode reactant gas is hydrogen. The degree of damage done to the anode and/or the cathode during start up/shut down (SU/SD) was a function of the number of transitions from one anode gas to the other. As the anode gas changed from hydrogen to air (oxygen) the voltage across the cell went from about 0.9 volt to 0 volt. The gas flow was alternated from 280 sccm air for 20 seconds to 800 sccm hydrogen for 15 seconds, and back again. In this particular test, this sequence was repeated until the desired number of gas switching events was obtained, herein referred to as a gas cycle. In the examples tested under the Evaluation Method, the gas switching number was 400.

Comparative Example A

Preparation of Nanostructured Whiskers

Nanostructured whiskers were prepared by thermal annealing a layer of perylene red pigment (C.I. Pigment Red 149, also known as "PR149", obtained from Clariant, Charlotte, N.C.), which was sublimation vacuum coated onto microstructured catalyst transfer polymer substrates (MCTS) with a nominal coating thickness of 200 nm, as described in U.S. Pat. No. 4,812,352 (Debe), the disclosure of which is incorporated herein by reference. For these examples the 90/3/3 (angle in degrees/distance between peaks (micrometer)/height most peaks/height of long repeat feature (micrometer)) and 120/5/0 were used. All MCTS structures gave a square root of two gain in surface area consistent with the Debe patent. After coating the coating with perylene red, the roll good was vacuum annealed in a line process, whereby the whiskers were formed as described in the patent.

Preparation of Nanostructured Thin Film (NSTF) Catalyst Layers

Nanostructured thin film (NSTF) catalyst layers were prepared by sputter coating catalyst films of Pt, Ru, and Ir sequentially using a DC-magnetron sputtering process onto the layer of nanostructured whiskers. The relative thickness of each layer was varied as desired.

A vacuum sputter deposition system (obtained as Model Custom Research from Mill Lane Engineering Co., Lowell, Mass.) equipped with 4 cryo-pumps (obtained from Austin Scientific, Oxford Instruments, Austin, Tex.), a turbo-pump and typical Ar sputter gas pressures of about 0.66 Pa, and 5 cm×25.4 cm (2 inch×10 inch) and rectangular sputter targets (obtained from Sophisticated Alloys, Inc., Butler, Pa.) was used. Before deposition, the sputtering chamber was evacuated to a base pressure of 9.3×10-6 Pa (7×10-7 Torr). The coatings were deposited by using ultra high purity Ar as the sputtering gas and magnetron power range from 30-300 watts. High purity (99.9+%), Pt, Ir, and Ru were used for the sputtering targets. A pre-sputter of each target was performed to clean the surface before deposition. The substrate to be sputtered on was positioned away from the sputtering targets. Each target was then lit for a given duration to eliminate any contaminants that may have formed on the target surfaces when the system was exposed to atmospheric pressure for sample loading. First, the Pt layer was coated directly on top of the nanostructured whiskers to obtain a Pt loading of about 20 microgram/cm$^2$. Then, Ir catalyst overlayers were sputtered onto the Pt layer to obtain an Ir loading of 15 microgram/cm$^2$.

To prepare the membrane electrode assembly (MEA) of Comparative Example A, the NSTF catalyst was used as the anode. The Comparative Example A MEA was tested for OER effectiveness durability using the MEA Evaluation Method described above. The cell voltage was observed to rise from an initial value of about 1.68 volt to 2.2 volts after about 5000 seconds.

Comparative Example B

Comparative Example B was prepared as described for Comparative Example A, except the NSTF catalyst had Pt loading of 20 microgram/cm$^2$, followed by 16 microgram/cm$^2$ of Zr, and then an Ir layer on top of Zr with an Ir loading of 15 microgram/cm$^2$. Comparative Example B was tested for its OER effectiveness durability using the MEA Evaluation Method described above. The results are plotted in FIG. 3.

Comparative Example C

Preparation of 25 microgram/cm$^2$ Dispersed Catalyst

The raw materials used were 50 wt % Pt on carbon catalyst powder (available under the trade designation "SA50BK" from N.E. CHEMCAT, Tokyo, Japan,) 825 equivalent weight perfluorosulfonic acid ionomer at 20% solids in 60/40 n-propyl alcohol/water (obtained from the 3M Company, St. Paul, Minn., under the trade designation "3M825"), plus additional n-propyl alcohol (nPa) and water in order to form an ink with an overall solids content of 12 wt %. The raw materials were mixed together to form an ink in a polyethylene bottle. A 250 gram bottle is used for 100-200 grams of ink. The ink mixture should contain between 5% and 25% solids to achieve a coatable viscosity, where solids wt % is tailored by adding in nPa and water to the ink. Mixing media consisting of 6 millimeter zirconia beads (obtained under the trade designation "ZIRBEADS" from Zircoa, Solon, Ohio) were added at a weight ratio between 1 and 4 times the weight of the ink. The ink was then rolled at between 30 and 180 revolutions per minute for between 4 and 96 hours to ensure adequate mixing and to achieve ink uniformity. This ink was then coated on a release liner using a Mayer rod (obtained from Industry Tech, Oldsmar, Fla.) number of between 36 and 72 (3.6 to 7.2 mils where 1 mil=25.4 micrometers). A standard release liner is a substrate that has release properties such that an ink can readily be coated upon it, and then after drying, the subsequent coated material can easily be removed by methods including lamination to an alternate substrate such as a membrane. The Mayer rod number for the coating must be adjusted to achieve the desired catalyst loading (Example: 400 microgram Pt/cm$^2$). The release liner+wet ink coating was then dried between 75° C. and 150° C. for between 3 and 10 minutes to achieve the dry electrode composition described in this work.

Comparative Example C was prepared as described for Comparative Example A, except that the NSTF catalyst had Zr loading of 16 microgram/cm$^2$, then Ir loading of 15 micrograms/cm$^2$, followed by a second lamination of Pt dispersed catalyst with a loading of 25 micrograms/cm$^2$ on top of the whiskers. The second lamination deviated from the Membrane Electrode Assembly (MEA) Preparation by replacing the stack's "PEM on liner" layer with laminated half catalyst coated membrane on liner before peeling, and the conditions were adjusted to 177° C. (350° F.) under 1.0 MPA (100 psig), at a feed rate of 36.5 centimeters/minute (1.2 feet per minute).

Comparative Example C was tested for its OER effectiveness durability using the MEA Evaluation Method described above. The results are plotted in FIG. 3.

Figure 3:
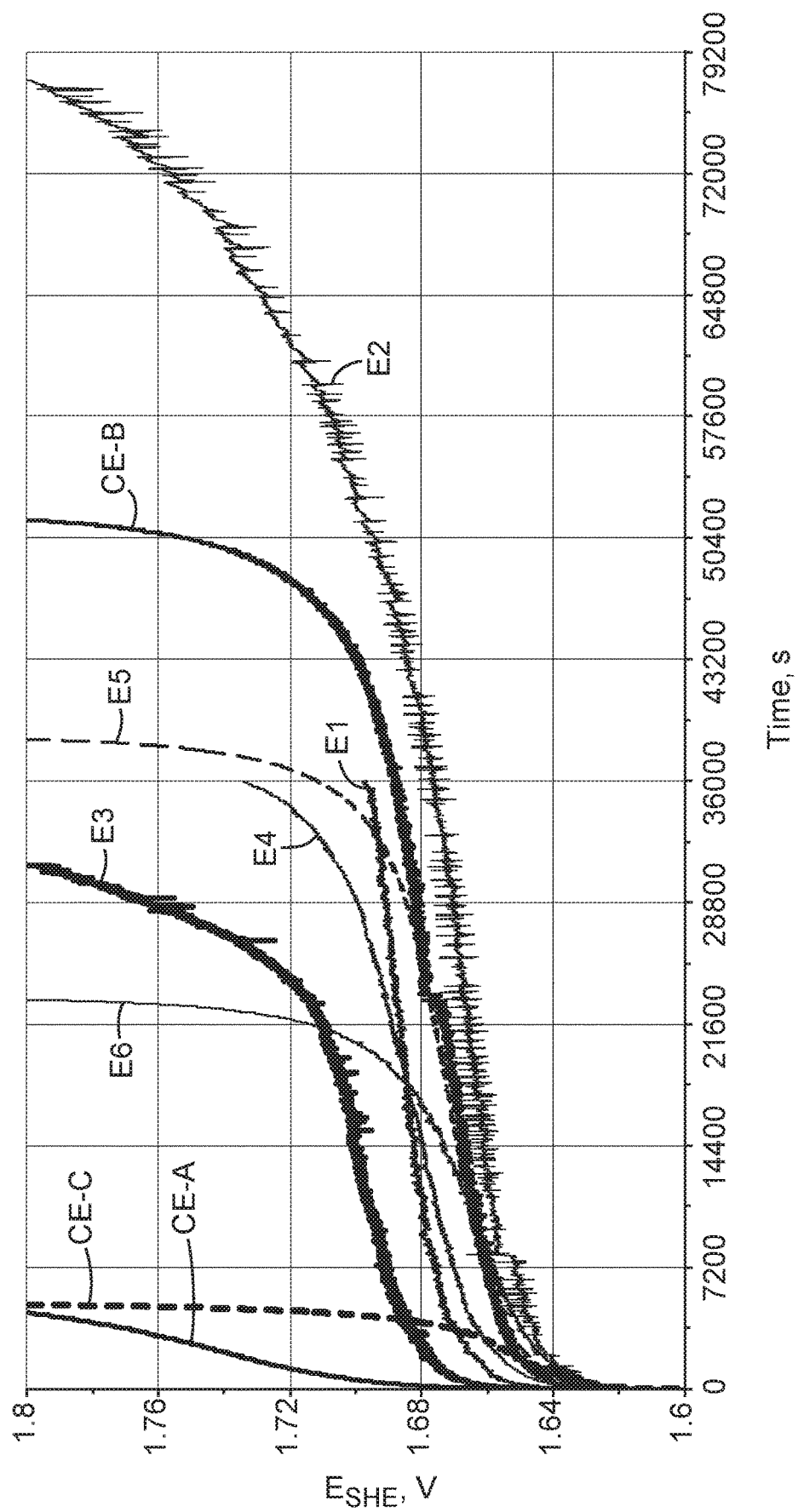
FIG. 3 is a plot showing the cell output voltage relative to the standard hydrogen electrode, $E_{SHE}$, as a function of time for Examples 1-6 and Comparative Examples A-C.

FIG. 3 shows test data from the MEAs of Comparative Examples A-C and the iterations of MEAs with Ir deposited on the microporous layer of the GDL listed in Examples 1-6. These MEAs were incorporated into fuel cells that were tested for OER durability during cell reversal according to the MEA Evaluation Method described above. The vertical axis of FIG. 3 shows the cell output voltage relative to the standard hydrogen electrode, $E_{SHE}$, as a function of time for the various MEAs in test cells. In this test, it was desired to keep the cell voltage under 1.7 volt as long as possible. The membrane electrode assemblies were prepared according to the MEA Preparation procedure described above. The carbon paper gas diffusion layers on the anode and cathode sides included a fluoropolymeric microporous layer (a gas diffusion micro-layer) that faced the respective anode and cathode catalyst layers. The hydrogen reduction reaction (HRR) catalyst, Pt, was incorporated into the anode catalyst layer on the polymer electrolyte membrane, as described below.

In Examples 1-6, the oxygen evolution reaction (OER) catalyst, here Ir, was deposited on the microporous layer of the GDL to form a catalyst coated backing (CCB). In the comparative examples, the Ir OER catalyst was incorporated directly into the anode catalyst layer on the PEM. In Comparative Examples B (CE-B) and C (CE-C) and Examples 2 (E2), 3 (E3), 5 (E5), and 6 (E6), a layer of Zr or Zr/Hf was deposited along with the Ir OER catalyst. In Comparative Example CE-B, the Zr layer having a planar equivalent thickness of 250 angstroms (25 nanometers) deposited on a nanostructured whisker layer with a surface roughness factor (surface area enhancement factor) of about 10 had the effect of physically separating the Pt from the Ir on the whiskers on the atomic scale, typically by a distance of 5-10 nanometers. Examples 1-6 were prepared as described for Comparative Example A, except with the designation and comments listed in the Table, below.

TABLE

| Example | Designation | Pt loading, microgram/cm² | Added layer thickness (planar equivalent) Å | Ir loading, microgram/cm² | Comment |
|---|---|---|---|---|---|
| CE-A | 20 Pt + 15 Ir | 20 | 0 | 15 | |
| CE-B | 20 Pt + 250 Å Zr + 15 Ir | 20 | 250 Zr | 15 | Zr spacer layer |
| CE-C | 200 Å Zr + 15 Ir + 25 Pt Disp Double Lamination | 25 as dispersed catalyst | 200 Zr | 15 | Ir on Zr whiskers, with a separate Pt dispersed layer |
| E1 | 20 Pt + 15 Ir CCB | 20 | 0 | 15 | |
| E2 | 20 Pt + 180 Å Zr/20 Å Hf + 15 IrCCB | 20 | 180 Zr/20 Hf | 15 | Zr, Hf mixed layer |
| E3 | 20 Pt + [15 Ir + 250 Å Zr]CCB | 20 | 250 Zr | 15 | Ir, Zr separate layers |
| E4 | 20 Pt + 10 Ir CCB | 20 | 0 | 10 | |
| E5 | 20 Pt + [250 Å Zr + 15 Ir]CCB | 20 | 250 Zr | 15 | Zr, Ir separate layers |
| E6 | 20 Pt + [250 Å Zr/ 15 Ir]CCB | 20 | 250 net Zr | 15 | Zr, Ir mixed layer |

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A membrane electrode assembly comprising, in order:
a first gas distribution layer;
a first gas dispersion layer;
an anode catalyst layer comprising a first catalyst;
a membrane;
a cathode catalyst layer comprising a second catalyst;
a second gas dispersion layer; and
a second gas distribution layer,
wherein the first gas distribution layer has first and second generally opposed major surfaces;
wherein the anode catalyst layer has first and second generally opposed major surfaces, wherein the second major surface of the first gas distribution layer is closer to the first major surface of the anode catalyst layer than to the second major surface of the anode catalyst layer;
wherein the membrane has first and second generally opposed major surfaces, wherein the second major surface of the anode catalyst layer is closer to the first major surface of the membrane than to the second major surface of the membrane;
wherein the cathode catalyst layer has first and second generally opposed major surfaces, wherein the second major surface of the membrane is closer to the first major surface of the cathode catalyst layer than to the second major surface of the cathode catalyst layer; and
wherein the second gas distribution layer has first and second generally opposed major surfaces, wherein the second major surface of the cathode catalyst layer is closer to the first major surface of the second gas distribution layer than to the second major surface of the second gas distribution layer,
wherein there is at least one of:
a layer comprising oxygen evolution reaction catalyst disposed on the first major surface of the first gas distribution layer;
the first gas distribution layer comprising oxygen evolution reaction catalyst;
a layer comprising oxygen evolution reaction catalyst disposed between the first gas distribution layer and the first gas dispersion layer;
a layer comprising oxygen evolution reaction catalyst disposed on a first major surface of the first gas dispersion layer;
a layer comprising oxygen evolution reaction catalyst disposed on a second major surface of the second gas dispersion layer;
a layer comprising oxygen evolution reaction catalyst disposed between the second gas distribution layer and the second gas dispersion layer;
the second gas distribution layer comprising oxygen evolution reaction catalyst; and
a layer comprising oxygen evolution reaction catalyst disposed on the second major surface of the second gas distribution layer.

2. The membrane electrode assembly of claim 1, wherein the anode catalyst layer comprises at least one of:
(a) at least one of elemental Au, Co, Fe, Ir, Mn, Ni, Os, Pd, Pt, Rh, or Ru;
(b) at least one alloy comprising at least one of Au, Co, Fe, Ir, Mn, Ni, Os, Pd, Pt, Rh, or Ru;
(c) at least one composite comprising at least one of Au, Co, Fe, Ir, Mn, Ni, Os, Pd, Pt, Rh, or Ru;
(d) at least one oxide of at least one of Au, Co, Fe, Ir, Mn, Ni, Os, Pd, Pt, Rh, or Ru;
(e) at least one organometallic complex of at least one of Au, Co, Fe, Ir, Mn, Ni, Os, Pd, Pt, Rh, or Ru;
(f) at least one carbide of at least one of Au, Co, Fe, Ir, Mn, Ni, Os, Pd, Pt, Rh, or Ru;
(g) at least one fluoride of at least one of Au, Co, Fe, Ir, Mn, Ni, Os, Pd, Pt, Rh, or Ru;
(h) at least one nitride of at least one of Au, Co, Fe, Ir, Mn, Ni, Os, Pd, Pt, Rh, or Ru;
(i) at least one boride of at least one of Au, Co, Fe, Ir, Mn, Ni, Os, Pd, Pt, Rh, or Ru;
(j) at least one oxycarbide of at least one of Au, Co, Fe, Ir, Mn, Ni, Os, Pd, Pt, Rh, or Ru;

(k) at least one oxyfluoride of at least one of Au, Co, Fe, Ir, Mn, Ni, Os, Pd, Pt, Rh, or Ru;
(l) at least one oxynitride of at least one of Au, Co, Fe, Ir, Mn, Ni, Os, Pd, Pt, Rh, or Ru; or
(m) at least one oxyboride of at least one of Au, Co, Fe, Ir, Mn, Ni, Os, Pd, Pt, Rh, or Ru.

3. The membrane electrode assembly of claim 1, wherein the anode catalyst layer comprises at least one of:
(a') at least one of elemental Al, carbon, Hf, Nb, Re, Si, Sn, Ta, Ti, W, or Zr;
(b') at least one alloy comprising at least one of elemental Al, carbon, Hf, Nb, Re, Si, Sn, Ta, Ti, W, or Zr;
(c') at least one composite comprising at least one of Al, carbon, Hf, Nb, Re, Si, Sn, Ta, Ti, W, or Zr;
(d') at least one oxide of at least one of Al, Hf, Nb, Re, Si, Sn, Ta, Ti, W, or Zr;
(e') at least one organometallic complex of at least one of Al, Hf, Nb, Re, Si, Sn, Ta, Ti, W, or Zr;
(f') at least one carbide of at least one of Al, Hf, Nb, Re, Si, Sn, Ta, Ti, W, or Zr;
(g') at least one fluoride of at least one of Al, carbon, Hf, Nb, Re, Si, Sn, Ta, Ti, W, or Zr;
(h') at least one nitride of at least one of Al, carbon, Hf, Nb, Re, Si, Sn, Ta, Ti, W, or Zr;
(i') at least one oxycarbide of at least one of Al, Hf, Nb, Re, Si, Sn, Ta, Ti, W, or Zr;
(j') at least one oxyfluoride of at least one of Al, Hf, Nb, Re, Si, Sn, Ta, Ti, W, or Zr;
(k') at least one oxynitride of at least one of Al, carbon, Hf, Nb, Re, Si, Sn, Ta, Ti, W, or Zr;
(l') at least one boride of at least one of Al, carbon, Hf, Nb, Re, Si, Sn, Ta, Ti, W, or Zr; or
(m') at least one oxyboride of at least one of Al, Hf, Nb, Re, Si, Sn, Ta, Ti, W, or Zr.

4. The membrane electrode assembly of claim 1, wherein the anode catalyst layer comprises nanostructured whiskers with the catalyst thereon.

5. The membrane electrode assembly of claim 1, wherein the cathode catalyst layer comprises at least one of:
(a") at least one of elemental Au, Co, Fe, Ir, Mn, Ni, Os, Pd, Pt, Rh, or Ru;
(b") at least one alloy comprising at least one of Au, Co, Fe, Ir, Mn, Ni, Os, Pd, Pt, Rh, or Ru;
(c") at least one composite comprising at least one of Au, Co, Fe, Ir, Mn, Ni, Os, Pd, Pt, Rh, or Ru;
(d") at least one oxide of at least one of Au, Co, Fe, Ir, Mn, Ni, Os, Pd, Pt, Rh, or Ru;
(e") at least one organometallic complex of at least one of Au, Co, Fe, Ir, Mn, Ni, Os, Pd, Pt, Rh, or Ru;
(f") at least one carbide of at least one of Au, Co, Fe, Ir, Mn, Ni, Os, Pd, Pt, Rh, or Ru;
(g") at least one fluoride of at least one of Au, Co, Fe, Ir, Mn, Ni, Os, Pd, Pt, Rh, or Ru;
(h") at least one nitride of at least one of Au, Co, Fe, Ir, Mn, Ni, Os, Pd, Pt, Rh, or Ru;
(i") at least one boride of at least one of Au, Co, Fe, Ir, Mn, Ni, Os, Pd, Pt, Rh, or Ru;
(j") at least one oxycarbide of at least one of Au, Co, Fe, Ir, Mn, Ni, Os, Pd, Pt, Rh, or Ru;
(k") at least one oxyfluoride of at least one of Au, Co, Fe, Ir, Mn, Ni, Os, Pd, Pt, Rh, or Ru;
(l") at least one oxynitride of at least one of Au, Co, Fe, Ir, Mn, Ni, Os, Pd, Pt, Rh, or Ru; or
(m") at least one oxyboride of at least one of Au, Co, Fe, Ir, Mn, Ni, Os, Pd, Pt, Rh, or Ru.

6. The membrane electrode assembly of claim 1, wherein the cathode catalyst layer comprises at least one of:
(a''') at least one of elemental Al, carbon, Hf, Nb, Re, Si, Sn, Ta, Ti, W, or Zr;
(b''') at least one alloy comprising at least one of Al, carbon, Hf, Nb, Re, Si, Sn, Ta, Ti, W, or Zr;
(c''') at least one composite comprising at least one of Al, carbon, Hf, Nb, Re, Si, Sn, Ta, Ti, W, or Zr;
(d''') at least one oxide of at least one of Al, Hf, Nb, Re, Si, Sn, Ta, Ti, W, or Zr;
(e''') at least one organometallic complex of at least one of Al, Hf, Nb, Re, Si, Sn, Ta, Ti, W, or Zr;
(f''') at least one carbide of at least one of Al, Hf, Nb, Re, Si, Sn, Ta, Ti, W, or Zr;
(g''') at least one fluoride of at least one of Al, carbon, Hf, Nb, Re, Si, Sn, Ta, Ti, W, or Zr;
(h''') at least one nitride of at least one of Al, carbon, Hf, Nb, Re, Si, Sn, Ta, Ti, W, or Zr;
(i''') at least one oxycarbide of at least one of Al, Hf, Nb, Re, Si, Sn, Ta, Ti, W, or Zr;
(j''') at least one oxyfluoride of at least one of Al, Hf, Nb, Re, Si, Sn, Ta, Ti, W, or Zr;
(k''') at least one oxynitride of Al, carbon, Hf, Nb, Re, Si, Sn, Ta, Ti, W, or Zr;
(l''') at least one boride of at least one of Al, carbon, Hf, Nb, Re, Si, Sn, Ta, Ti, W, or Zr; or
(m''') at least one oxyboride of at least one of Al, Hf, Nb, Re, Si, Sn, Ta, Ti, W, or Zr.

7. The membrane electrode assembly of claim 1, wherein the cathode catalyst layer comprises nanostructured whiskers with the catalyst thereon.

8. The membrane electrode assembly of claim 1, wherein the first gas dispersion layer has first and second generally opposed major surfaces, wherein the second major surface of the first gas distribution layer is closer to the first major surface of the first gas dispersion layer than to the second major surface of the first gas dispersion layer.

9. The membrane electrode assembly of claim 8, wherein the first gas distribution layer is essentially free of Pt.

10. The membrane electrode assembly of claim 1, wherein the second gas dispersion layer has first and second generally opposed major surfaces, wherein the second major surface of the cathode catalyst layer is closer to the first major surface of the second gas dispersion layer than to the second major surface of the second gas dispersion layer.

11. The membrane electrode assembly of claim 10, wherein the second gas distribution layer is essentially free of Pt.

12. An electrochemical device comprising at least one of a membrane electrode assembly of claim 1.

13. The electrochemical device of claim 12, which is a fuel cell.

* * * * *

UNITED STATES PATENT AND TRADEMARK OFFICE
CERTIFICATE OF CORRECTION

PATENT NO. : 10,700,372 B2
APPLICATION NO. : 15/531786
DATED : June 30, 2020
INVENTOR(S) : Gregory Haugen et al.

It is certified that error appears in the above-identified patent and that said Letters Patent is hereby corrected as shown below:

In the Specification

Column 8
Line 19, Delete "$C_2O_3$," and insert -- $Co_2O_3$, --, therefor.
Line 60, Delete "in" and insert -- $\pi$ --, therefor.
Line 61, Delete "2-" and insert -- $\pi$- --, therefor.

Column 9
Line 43, Delete "$Au_xBy$," and insert -- $Au_xB_y$, --, therefor.
Line 45, Delete "$Ir_xBy$," and insert -- $Ir_xB_y$, --, therefor.

Column 10
Line 25, Delete "$C_2O_3$," and insert -- $Co_2O_3$, --, therefor.
Line 47, Delete "it" and insert -- $\pi$ --, therefor.

Column 11
Line 34, Delete "r-acids" and insert -- $\pi$-acids --, therefor.
Line 48, Delete "$Au_xBy$," and insert -- $Au_xB_y$, --, therefor.
Line 48, Delete "$Ni_xBy$," and insert -- $Ni_xB_y$, --, therefor.
Line 49, Delete "$Ir_xBy$," and insert -- $Ir_xB_y$, --, therefor.

Column 14
Line 37, Delete "in" and insert -- $\pi$ --, therefor.

Column 15
Line 12, Delete "$TisC_{12}^+$" and insert -- $Ti_8C_{12}^+$ --, therefor.
Line 27, Delete "$TasB_6$," and insert -- $Ta_5B_6$, --, therefor.

Column 17
Line 17, Delete "in" and insert -- $\pi$ --, therefor.

Signed and Sealed this
Eighth Day of December, 2020

Andrei Iancu
*Director of the United States Patent and Trademark Office*

CERTIFICATE OF CORRECTION (continued)
U.S. Pat. No. 10,700,372 B2

Line 49, Delete "r-acids" and insert -- π-acids --, therefor.
Line 58, Delete "TisC$_{12+}$" and insert -- Ti$_8$C$_{12}^+$ --, therefor.

Column 18
Line 5, Delete "TasB$_6$," and insert -- Ta$_5$B$_6$, --, therefor.
Line 21, Delete "Valdrie" and insert -- Valérie --, therefor.

In the Claims

Column 35
Line 19, In Claim 3, delete "(f)" and insert -- (f') --, therefor.